(12) United States Patent
Pereira et al.

(10) Patent No.: US 7,702,435 B2
(45) Date of Patent: Apr. 20, 2010

(54) METHOD AND APPARATUS FOR SYSTEM MONITORING AND MAINTENANCE

(75) Inventors: Ashley A. Pereira, Mississauga (CA); Muhammad Ashraf Javed, Mississauga (CA); Chun Ho Lam, Toronto (CA); Chung-Yan Yuen, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 1218 days.

(21) Appl. No.: 11/252,768

(22) Filed: Oct. 19, 2005

(65) Prior Publication Data

US 2006/0126608 A1  Jun. 15, 2006

Related U.S. Application Data

(60) Provisional application No. 60/625,172, filed on Nov. 5, 2004.

(51) Int. Cl.
*G06F 7/00* (2006.01)

(52) U.S. Cl. ....................................................... 701/29

(58) Field of Classification Search ............ 701/9, 701/27, 29–31, 34; 702/183
See application file for complete search history.

(56) References Cited

U.S. PATENT DOCUMENTS

| | | |
|---|---|---|
| 4,841,456 A | 6/1989 | Hogan, Jr. et al. |
| 4,943,919 A | 7/1990 | Aslin et al. |
| 5,041,976 A | 8/1991 | Marko et al. |
| 5,408,412 A | 4/1995 | Hogg et al. |
| 5,414,645 A | 5/1995 | Hirano |
| 5,428,525 A | 6/1995 | Cappelaere |
| 5,631,831 A | 5/1997 | Bird et al. |
| 5,778,381 A | 7/1998 | Sandifer |
| 6,119,047 A | 9/2000 | Eryurek et al. |
| 6,122,575 A | 9/2000 | Schmidt et al. |
| 6,192,302 B1 * | 2/2001 | Giles et al. ..................... 701/29 |
| 6,487,479 B1 | 11/2002 | Nelson |
| 6,574,537 B2 | 6/2003 | Kipersztok et al. |
| 6,609,036 B1 | 8/2003 | Bickford |
| 6,615,090 B1 | 9/2003 | Blevins et al. |
| 6,633,782 B1 | 10/2003 | Schleiss et al. |
| 6,643,801 B1 | 11/2003 | Jammu et al. |
| 6,662,089 B2 | 12/2003 | Felke et al. |
| 6,687,637 B2 | 2/2004 | Garabedian |
| 6,725,137 B2 | 4/2004 | Eagleton |

(Continued)

OTHER PUBLICATIONS

Naghedolfeizi et al., 2003, "Artificial Neural Network Models for Predicting Degradation Trends in System Components and Sensors", *IEEE Autotestcon Proceedings* pp. 647-651.

(Continued)

*Primary Examiner*—Kim T Nguyen
(74) *Attorney, Agent, or Firm*—Oral Caglar, Esq.

(57) ABSTRACT

A method and an apparatus provide intelligent monitoring and maintenance of a system. The method according to one embodiment accesses data relating to functional components of the system; extracts parameter information for functional components of the system, the step of extracting parameter information including performing inferential processing and trend recognition of the data using previous knowledge about the system, and simulating performance of the system using models of the system and previous knowledge about the system; identifies new information about the system present in extracted parameter information; and provides the new information to the step of extracting parameter information, to be used as previous knowledge.

17 Claims, 16 Drawing Sheets

U.S. PATENT DOCUMENTS

| | | |
|---|---|---|
| 6,748,304 B2 | 6/2004 | Felke et al. |
| 6,751,536 B1 * | 6/2004 | Kipersztok et al. ............ 701/29 |
| 6,829,527 B2 | 12/2004 | Felke et al. |
| 6,868,319 B2 | 3/2005 | Kipersztok et al. |
| 2002/0138184 A1 | 9/2002 | Kipersztok et al. |
| 2003/0093204 A1 | 5/2003 | Adachi et al. |
| 2003/0167111 A1 | 9/2003 | Kipersztok et al. |
| 2003/0187554 A1 * | 10/2003 | Henry et al. .................. 701/29 |
| 2003/0191563 A1 | 10/2003 | Eagleton et al. |
| 2003/0195675 A1 | 10/2003 | Felke et al. |
| 2003/0195678 A1 | 10/2003 | Betters et al. |
| 2003/0204370 A1 | 10/2003 | Yemini et al. |
| 2004/0002776 A1 | 1/2004 | Bickford |
| 2004/0034456 A1 | 2/2004 | Felke et al. |
| 2004/0039499 A1 | 2/2004 | Felke et al. |
| 2004/0111197 A1 | 6/2004 | Kipersztok et al. |
| 2004/0126782 A1 * | 7/2004 | Holden et al. ................. 435/6 |
| 2004/0162705 A1 | 8/2004 | Grieb et al. |
| 2004/0176887 A1 | 9/2004 | Kent et al. |
| 2004/0199307 A1 | 10/2004 | Kipersztok et al. |
| 2005/0021212 A1 | 1/2005 | Gayme et al. |
| 2005/0021294 A1 | 1/2005 | Trsar et al. |
| 2005/0043870 A1 | 2/2005 | Joshi et al. |
| 2005/0065678 A1 | 3/2005 | Smith et al. |
| 2005/0102044 A1 | 5/2005 | Kohn et al. |
| 2008/0208532 A1 * | 8/2008 | Blemel ....................... 702/183 |

OTHER PUBLICATIONS

Steadman et al., 2002, "Reducing No Fault Found Using Statistical Processing and an Expert System", *IEEE Autotestcon Proceedings* pp. 872-878.

Yu et al., 2004, "A Novel Approach to Aircraft Engine Anomaly Detection and Diagnostics", *IEEE Aerospace Conference Proceedings* pp. 3468-3475.

* cited by examiner

METHOD AND APPARATUS FOR SYSTEM MONITORING AND MAINTENANCE

CROSS REFERENCE TO RELATED APPLICATION

The present application claims priority under 35 USC §119(e) to U.S. Provisional Application No. 60/625,172 filed Nov. 5, 2004, which is hereby incorporated by reference herein in its entirety.

BACKGROUND OF THE INVENTION

1. Field of the Invention

The present invention relates to diagnostics and maintenance of complex systems, especially applicable to vehicle systems, and more particularly to a method and apparatus providing intelligent systems monitoring and maintenance.

2. Description of the Related Art

Complex systems such as industrial facilities, or airborne, terrestrial and marine vehicles, are monitored for maintenance purposes and operated by complex control systems. Such control systems are responsible for the operational health, correct maintenance, and general functions of the vehicle or industrial facility. Examples of control systems that also support maintenance and monitoring are an environmental control system (ECS) located on an aircraft, a central computer that controls a flight, a power generation and management system, etc. Control systems of vehicles and system integration laboratory (SIL) facilities monitor performance of individual functional parts commonly known in the industry as Line Replaceable Components or LRCs. Control systems of vehicles and laboratory facilities also monitor the performance of systems that contain the LRCs. Examples of LRCs are sensors, effectors (e.g. valves, pumps, etc.), filters, controllers, etc.

Existing techniques to monitor and maintain vehicle systems or SIL facilities suffer from a host of technical problems that limit the effectiveness of such techniques. Diagnosing of faults without clearly identifiable causes, also known as ambiguous faults, pose a significant challenge to monitoring and maintenance systems. Examples of ambiguous faults are: complex faults that can be caused by failures of multiple LRCs (e.g., excessive cabin temperature fault); No Fault Found reports; and Can Not Duplicate faults. Existing monitoring and maintenance systems have difficulty in correctly isolating the failed LRC in a complex fault with apparent fault symptoms that can be caused by an improper operation, and/or by failures of multiple LRCs. Faced with such a fault scenario, existing monitoring and maintenance systems will simply report multiple failed LRCs.

No Fault Found reports are another type of ambiguous faults. No Fault Found reports cast a doubt on the reliability of the vehicle's subsystems and lead to maintenance personnel's loss of faith in onboard diagnostic results. Subsystem-level Can Not Duplicate faults are especially troublesome and require an in-depth understanding of the performance of the subsystem and its master system. Can Not Duplicate faults also cast a doubt on the reliability of the vehicle's subsystems. Even when No Fault Found and Can Not Duplicate faults are resolved, it is often difficult to verify during systems operation that the faults were correctly resolved.

Monitoring and maintenance systems also provide interpretation of operational test results of vehicle system or SIL facility. However, the tests performed during system operation can produce highly correlated and complex data that requires a thorough understanding of the system performance in order to decipher anomalies hidden in apparently healthy data.

Personnel maintaining or operating a complex vehicle system or lab facility are often not trained to comprehensively understand the intricacies of the embedded diagnostic logic and system performance data, particularly for a newer system where experience based know-how is not yet present. Such training deficiencies cause delay in resolution of system operational issues and present an opportunity for healthy Line Replaceable Components being wrongly identified as failed and then replaced.

Due to the above drawbacks, existing techniques for monitoring and maintaining complex systems present significant commercial challenges. Incorrect or incomplete resolution of system problems and failures add considerable expense to the life cycle costs (LCC) to maintain and operate aircrafts, ships, and lab facilities. Dollar by the hour for maintenance work is a key metric entering costs to diagnose, solve and repair issues on the airplanes, for example. Currently available technology for monitoring and maintaining aircraft systems increase dollar by the hour amounts due to incidences of incorrect or incomplete servicing of the aircraft.

A few publications have studied techniques for monitoring and maintaining complex vehicle and lab systems. In one such technique, a relational database containing fault models and symptom data is used to maintain and diagnose problems aboard an aircraft. However, the technique relies on a clear correspondence between each fault mode and its functional cause. No Fault Found and Can Not Duplicate reports cannot therefore be addressed effectively enough, as there is no clear information as to what fault model and component might have caused them.

According to another technique, the systems that host failed components are isolated, while individual Line Replaceable Components that caused the faults are not isolated.

A disclosed embodiment of the application addresses these and other issues by utilizing an intelligent systems maintenance/monitor system. The system can eliminate identification errors of failed Line Replaceable Components, provide resolution of No Fault Found and Can Not Duplicate reports, learn new fault modes, and train maintenance and engineering personnel.

SUMMARY OF THE INVENTION

The present invention is directed to a method and an apparatus for intelligent monitoring and maintenance of a system. According to a first aspect of the present invention, a method for intelligent monitoring and maintenance of a system comprises: accessing data relating to functional components of the system; extracting parameter information for functional components of the system, the step of extracting parameter information including performing inferential processing and trend recognition of the data using previous knowledge about the system, and simulating performance of the system using models of the system and previous knowledge about the system; identifying new information about the system present in extracted parameter information; and providing the new information to the step of extracting parameter information, to be used as previously learned knowledge.

According to a second aspect of the present invention, an apparatus for intelligent monitoring and maintenance of a system comprises: a smart interface engine for accessing data relating to functional components of the system; a database containing previous knowledge about the system; a logic engine for extracting parameter information for the functional components of the system, the logic engine extracting parameter information for functional components by performing inferential processing and trend recognition of the data using previous knowledge about the system from the database, and utilizing a performance simulator to simulate performance of the system using models of the system and previous knowledge about the system from the database; and a confirmatory engine for updating the database with new information present in the extracted parameter information.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
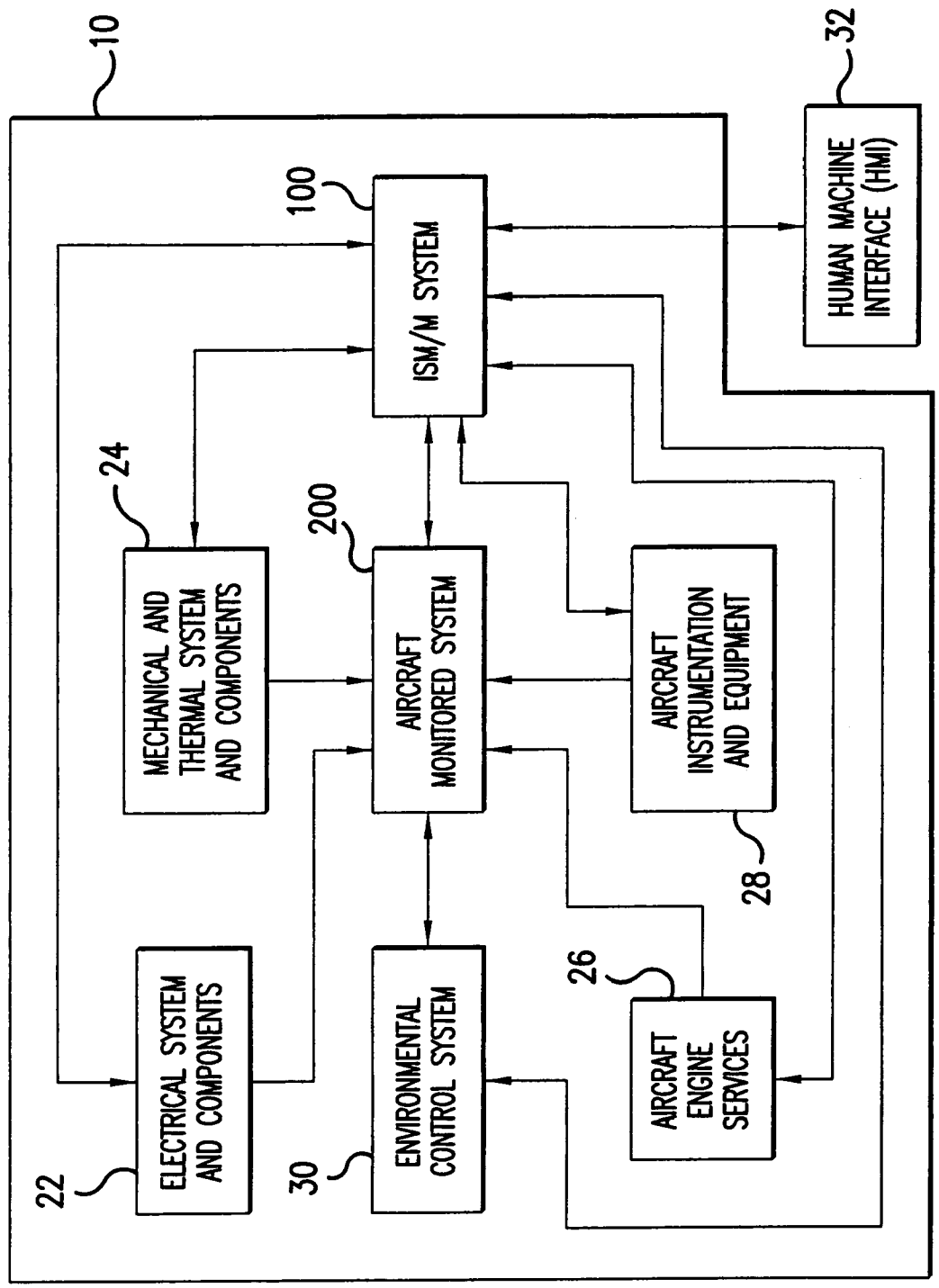
FIG. 1 is a block diagram of an aircraft system containing an intelligent systems maintenance/monitor system according to an embodiment of the present invention.

Aspects of the invention are more specifically set forth in the accompanying description with reference to the appended figures. Although aspects of the present invention are described and illustrated in the context of a vehicle environmental control system (ECS), it should be recognized that principles of the present invention are not limited to such an environment. FIG. 1 is a block diagram of a typical aircraft system 10 containing an intelligent systems maintenance/monitor (ISM/M) system 100 according to an embodiment of the present invention. Aircraft system 10 illustrated in FIG. 1 includes the following components: electrical system and components 22; mechanical and thermal system and components 24; aircraft engine services 26; aircraft instrumentation and equipment 28; environmental control system 30; aircraft monitored system 200; and ISM/M system 100. A human machine interface (HMI) 32 is provided for input/output of information and commands to/from the ISM/M system 100 of aircraft system 10. Operation of aircraft system 10 in FIG. 1 will become apparent from the following discussion.

Typical electrical system and components 22 include electrical circuits located on an aircraft, such as a remote-control system, a generator, a video system, etc. Mechanical and thermal system and components 24 include mechanical and thermal components located on an aircraft, such as turbines, combustors, rotors, bearings, blades, etc. Aircraft engine services 26 include an engine of an aircraft, associated systems that control the engine and provide feedback to the engine, etc. Environmental control system (ECS) 30 includes an aircraft heating system, an aircraft air-conditioning system, etc. Aircraft monitored system 200 includes electronic and software components that collect and store data generated during operation, testing, ground maintenance of an aircraft. Such data includes pressure data, temperature data, flow data, actuator state data resident on an environmental controller, electronic information from an aircraft controller etc. Aircraft monitored system 200 collects real-time data from electrical system and components 22, mechanical and thermal system and components 24, aircraft engine services 26, aircraft instrumentation and equipment 28, and environmental control system 30. ISM/M system 100 receives information from aircraft monitored system 200 and monitors electrical system and components 22, mechanical and thermal system and components 24, aircraft engine services 26, aircraft instrumentation and equipment 28, and environmental control system 30. ISM/M system 100 also communicates with human machine interface 32, which is an interface for the engineering and maintenance team that operates, maintains, and services the aircraft.

The ISM/M system 100, and a method providing functions of an ISM/M system 100, solve cost and scheduling problems that include lengthy time to repair for an aircraft, erroneous replacement of Line Replaceable Components (LRCs), and unplanned aircraft maintenance. Time to repair an aircraft includes time needed to isolate faulty LRCs and resolve existing ambiguity in faulted LRCs. ISM/M system 100 shortens the time to repair an aircraft by supplementing the on board diagnostics system with a quick and successful diagnosis of in-flight and on-ground No Fault Found (NFF) and Can Not Duplicate (CND) faults scenarios. ISM/IM system 100 also provides quick isolation of faulty LRCs, develops a thorough understanding of aircraft system performance and system data using ground tests, and provides efficient training to the aircraft maintenance and engineering team. By shortening overall time to repair for an aircraft, ISM/M system 100 achieves direct cost savings.

Replacement of erroneously isolated LRCs and lack of means to verify maintenance actions against NFF and CND cases can result in healthy functional parts being replaced and grounding of an aircraft for unplanned maintenance. Replacement of healthy functional parts and impact of unplanned maintenance on operational schedule and parts inventory for an aircraft are among the major sources of extra cost. ISM/M system 100 correctly isolates faulty LRCs, avoids replacement of erroneously isolated LRCs, and eliminates unplanned maintenance for an aircraft, effectively reducing maintenance costs.

One embodiment of ISM/M system 100 is a system that provides value-added systems engineering expertise "in a box" for vehicle and industrial systems. Another embodiment of ISM/M system 100 may be a laptop-based software tool that provides reliable in-situ or remote solutions to technical problems encountered on vehicles and other complex systems. ISM/M system 100 can be used on a vehicle production line, on a flight line, in an aircraft production debug system, on an airborne aircraft, on ships, cars and submarines, or in a lab facility.

Figure 2:
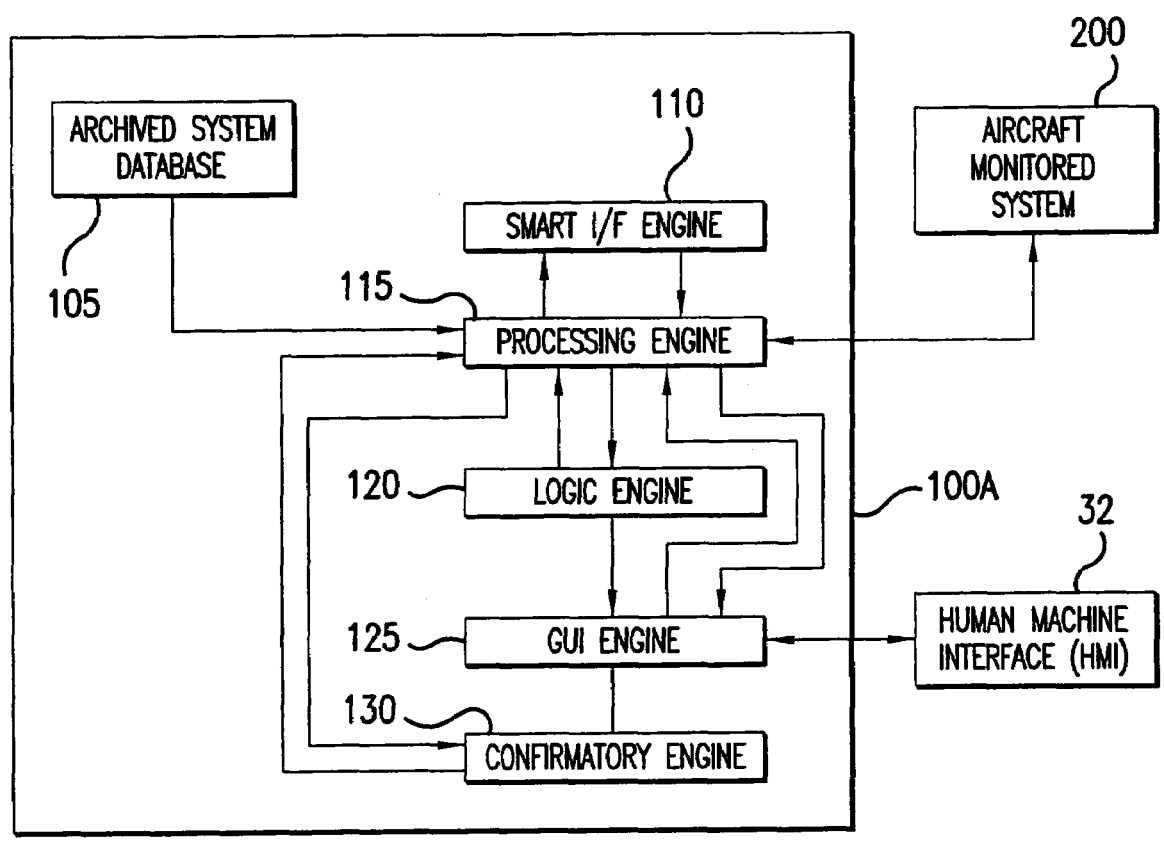
FIG. 2 is a functional block diagram of an intelligent systems maintenance/monitor system according to an embodiment of the present invention.

FIG. 2 is a functional block diagram of an intelligent systems maintenance/monitor system 100A according to an embodiment of the present invention. ISM/M system 100A includes a plurality of functional modules as illustrated in FIG. 2: an archived system database 105; a smart interface (I/F) engine 110; a processing engine 115; a logic engine 120; a graphical user interface (GUI) engine 125; and a confirmatory engine 130. Although the functional modules included in ISM/M system 100A are shown as discrete elements, it should be recognized that this illustration is for ease of explanation and that the associated functions of the functional modules can be performed by one or more physical elements, such as a microprocessors or a network of microprocessors.

Aircraft monitored system 200 sends aircraft data generated during operation, diagnosis, and testing of an aircraft to ISM/M system 100A. Archived system database 105 stores data for typical test cases and failure scenarios of aircraft components and systems. Test cases and failure scenarios are generated via simulation, and are subsequently validated during flight and integration tests of an aircraft. Models for all components of an aircraft are stored in archived system database 105. Models for aircraft subsystems are also stored in archived system database 105. Typical examples of modeled aircraft subsystems are: thermal management system; air-cycle machines; cabin pressurization system; bleed air management system; and liquid lubrication system. Specific values and parameters of systems and components under normal performance conditions are also stored in archived system database 105.

Smart I/F Engine 110 contains all the necessary communication protocols and capabilities to extract the flight data in a real time extraction mode, as well as in a playback mode from stored data coming from the aircraft. Smart I/F engine 110 extracts pertinent data from aircraft data received from aircraft monitored system 200. Pertinent data includes any data related to aircraft systems and components as well as aircraft performance. The data extracted by Smart I/F Engine 110 is preprocessed by the Processing Engine 115 for use in the Logic Engine 120.

Logic Engine 120 embodies for example a fifth generation computing language based embodiment of fuzzy logic, artificial neural network and statistical techniques. Logic engine 120 performs inferential processing and trend recognition of data extracted by Smart I/F engine 110. The Logic Engine 120 processes this data by removing redundancy and encoding the extracted data in the form of characteristic behaviors of the system as determined by each failure mode of the system. It is these characteristic representations of the system behavior that forms a basis of comparison against archived system database 105 values, along with the relevant operational conditions. Logic engine 120 also uses a "performance simulator" to investigate likely failure scenarios of aircraft components and systems.

GUI engine 125 generates visual displays and graphical snapshots of aircraft systems and components under investigation, based on analysis results from logic engine 120. Confirmatory engine 130 performs post maintenance confirmatory tests, such as tests to confirm replacement of faulty LRCs and resolution of NFF and CND cases. Confirmatory engine 130 also monitors when an aircraft is ready for return to service. Processing engine 115 performs overall control functions including timing and scheduling of tasks, converting of raw data, directing flow of data, etc. The Logic Engine 120 communicates with Processing Engine 115 and GUI Engine 125. The GUI Engine 125 communicates with the outside world interactively through human machine interface (HMI) 32.

ISM/M system 100A analyzes aircraft data received from aircraft monitored system 200, using data stored in archived system database 105. Analysis of aircraft data by ISM/M system 100A includes: recognition, isolation and inference of failures of LRCs; inference of causes for NFF and CND faults; monitoring of trends in aircraft performance; resolution of ambiguous aircraft faults; interpretation of systems and operational aircraft test results; implementation of advanced prognostic and health management (PHM) technologies; output of diagnostic and fault information via hyperlinks that can quickly aid a technician or engineer in plain English; output of a value-added visual aid (VA2) such as a system-wide graphical snapshot of an aircraft system, for training and subsequent support of maintenance and systems engineering crew; and output of real time status reports of an aircraft system, by wireless technology.

Figure 3:
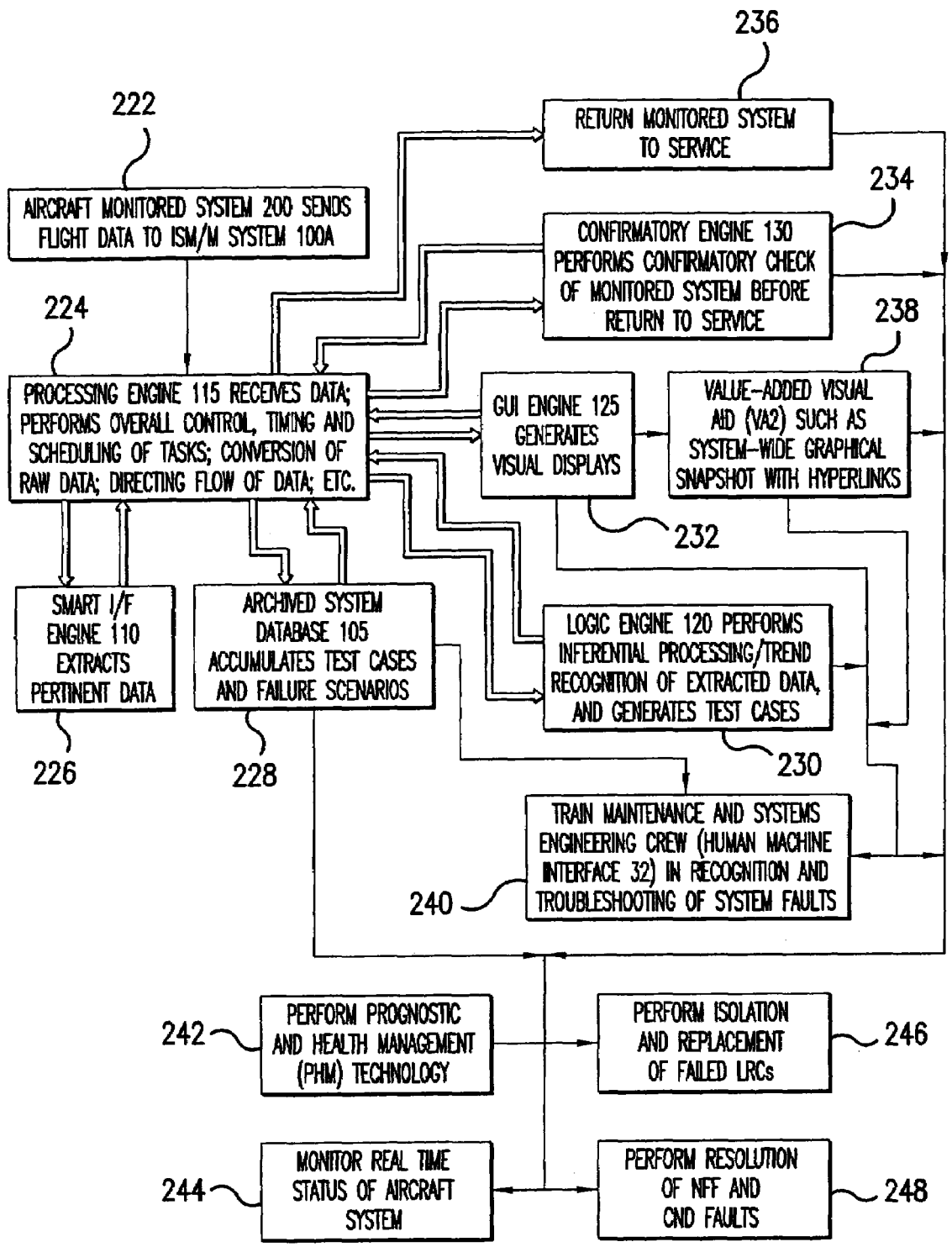
FIG. 3 is a flow diagram illustrating operations performed by an intelligent systems maintenance/monitor system to maintain and monitor an aircraft system according to an embodiment of the present invention.

FIG. 3 is a flow diagram illustrating operations performed by an ISM/M system 100A to maintain and monitor an aircraft system according to an embodiment of the present invention. Aircraft monitored system 200 sends flight data to ISM/M system 100A (step 222). Flight data is received by processing engine 115, which performs overall control, timing and scheduling of tasks, conversion of raw data, direction of data flow, etc (step 224). Processing engine 115 sends data to Smart I/F engine 110, which extracts pertinent data from flight data and sends pertinent data to processing engine 115 (step 226). Processing engine 115 also retrieves previous knowledge about the aircraft system from archived system database 105 that accumulates test cases and failure scenarios (step 228). Logic engine 120 receives previous knowledge from archived system database 105 and pertinent data extracted from Smart I/F engine 110 via processing engine 115. Logic engine 120 then performs inferential processing and trend recognition of extracted pertinent data (step 230). Logic engine 120 also generates various test cases on a system performance simulator, in order to simulate failure scenarios for training of maintenance personnel. A dynamic model of a system that simulates the system performance with a failed LRC can play the function of a performance simulator. GUI engine 125 generates visual displays based on analysis done by logic engine 120 (step 232). Confirmatory engine 130 performs confirmatory checks of the monitored aircraft system before a return to service (step 234). Confirmatory engine 130 also sends status reports of monitored aircraft system to processing engine 115. If the aircraft system is ready for deployment, processing engine 115 sends a command to return monitored aircraft system to service (step 236). GUI engine 125 generates value-added visual aids (VA2) such as system-wide graphical snapshots with hyperlinks (step 238). The VA2 aids compare and contrast, synthesize and process information.

ISM/M system 100A is a valuable tool for quick and cost-effective training and subsequent support of maintenance and systems engineering crew working on today's complex aircraft systems. Knowledge base and test cases located in archived system database 105, inferential processing, and trend recognition results from logic engine 120 describing relationships between aircraft components, and visual displays generated by GUI engine 125 including the VA2 visual aid train the maintenance and systems engineering crew (using human machine interface 32) to understand the system, and to recognize and troubleshoot system faults (step 240).

Knowledge base located in archived system database 105, inferential processing and trend recognition results from logic engine 120, visual displays generated by GUI engine 125 including VA2 visual aids, confirmatory engine 130 checks, and commands for return of aircraft system to service, are used to run PHM technologies, to isolate and replace failed LRCs, to monitor aircraft system 10 in real time, and to resolve NFF and CND faults. The list of operations performed by ISM/M system 100A shown in FIG. 3 is not exhaustive. Additional operations may be performed by ISM/IM system 100A.

Figure 4:
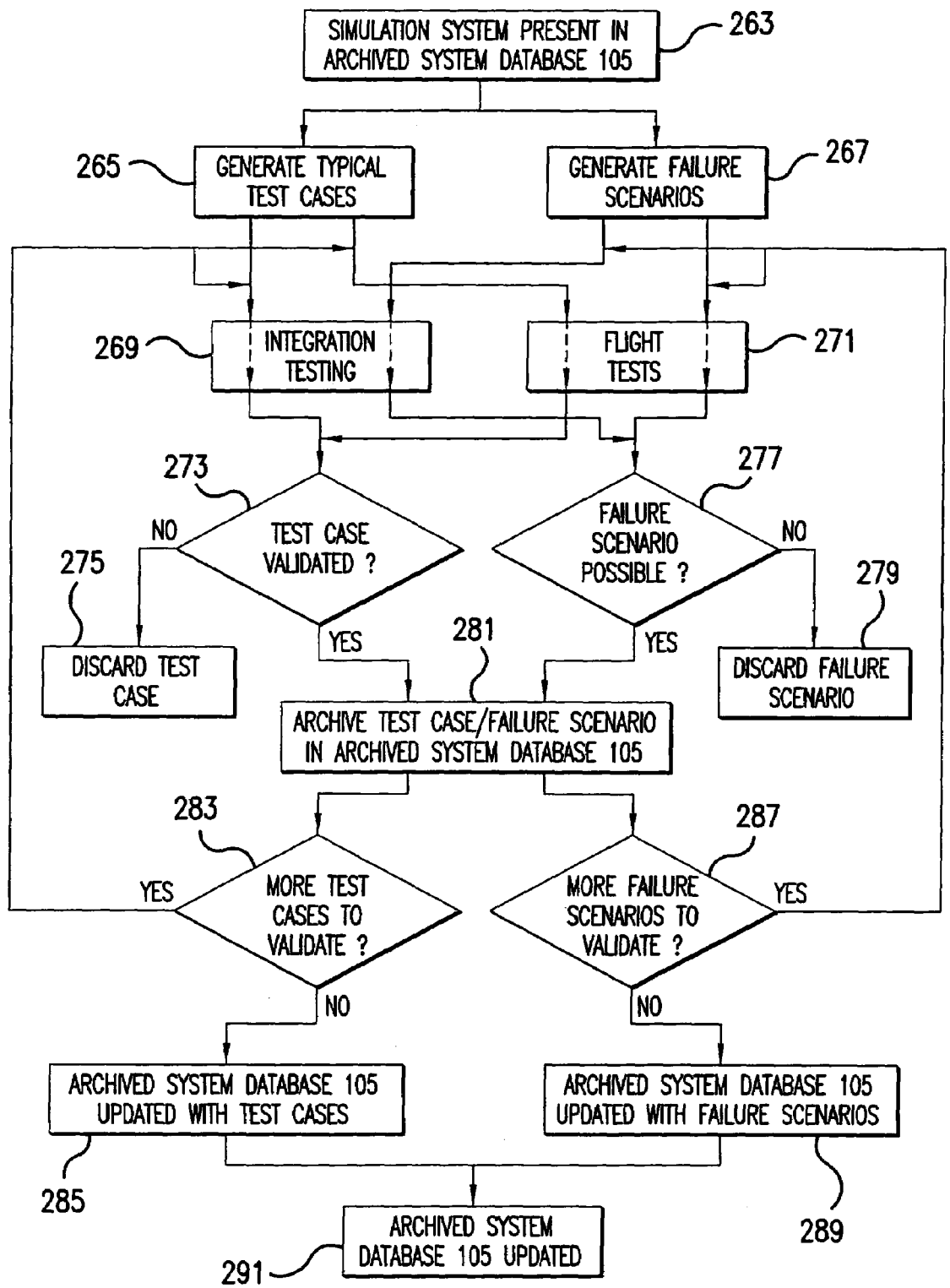
FIG. 4 is a flow diagram illustrating a technique for generating and updating an archived system database included in an intelligent systems maintenance/monitor system according to an embodiment of the present invention.

FIG. 4 is a flow diagram illustrating a technique for generating and updating an archived system database 105 included in an ISM/M system 1 00A according to an embodiment of the present invention. A simulation system 263 included in archived system database 105 generates data for archived system database 105. Simulation system 263 executes typical test cases (step 265) and generates failure scenarios (step 267). Data provided by the Simulation System 263 forms a basis for building the meta-knowledge that will become a part of the archived system database 105, after validation. Each typical test case and failure scenario passes through integration testing (step 269) and flight tests (step 271) for validation. If a test case is not validated (step 273), then it is discarded (step 275). Similarly, if a failure scenario is not validated (step 277), it is discarded (step 279). If a test case is validated (step 273), the test case is added to the archived system database 105 (step 281). Similarly, if a failure scenario is validated (step 277), it is added to the archived system database 105 (step 281). Tests are performed to check if there are more test cases and failure scenarios to validate (steps 283, 287). If the answer is yes, new unvalidated test cases and new unvalidated failure scenarios are selected and passed through integration testing (step 269) and flight tests (step 271). When all test cases and failure scenarios have been either validated or discarded, update of archived system database 105 is complete with test cases (step 285) and failure scenarios (step 289). Archived system database 105 has therefore been updated (step 291). The technique described in FIG. 4 can populate an empty archived system database 105, or add more knowledge base to an already populated archived system database 105.

Figure 5:
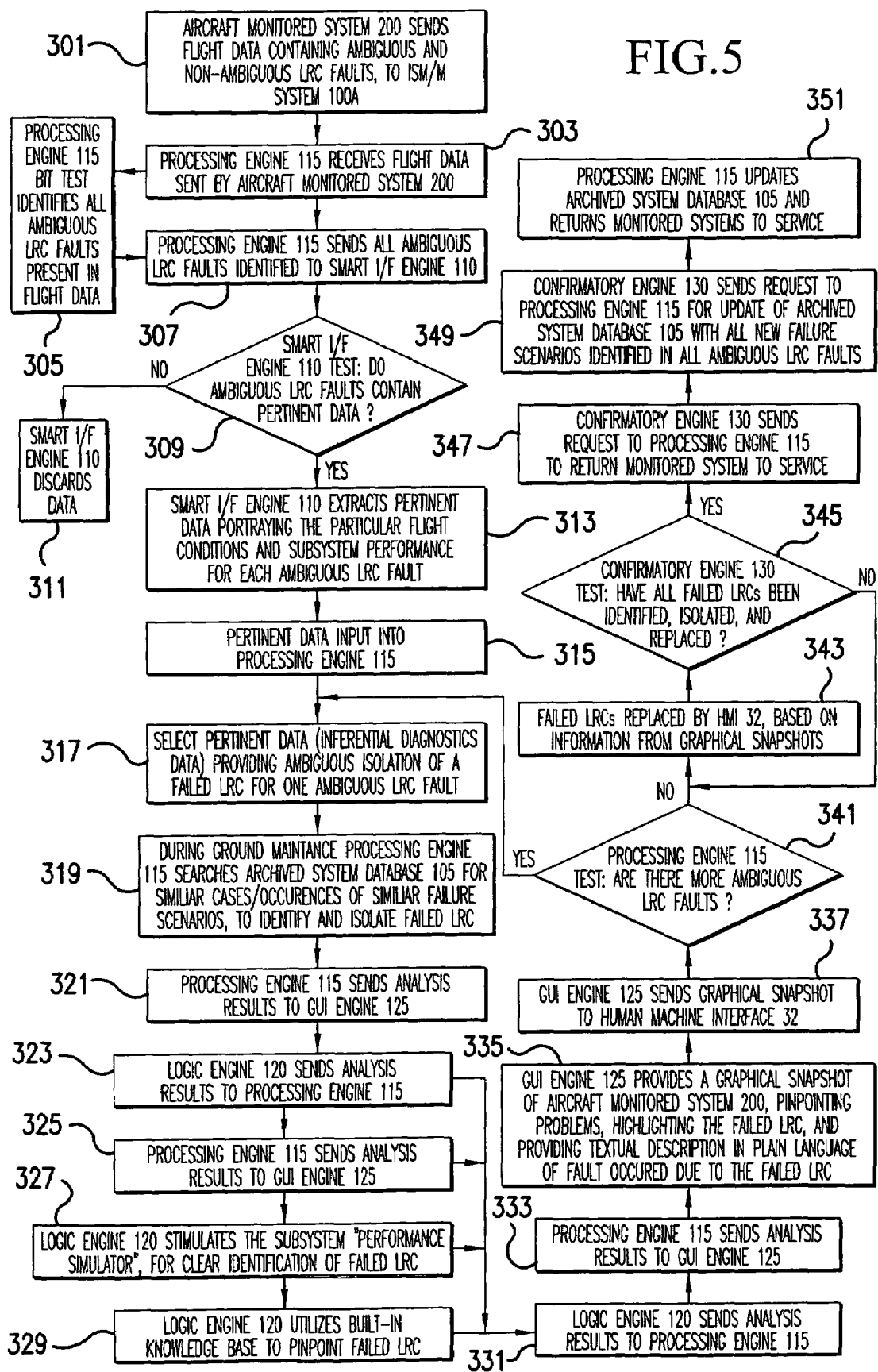
FIG. 5 is a flow diagram illustrating operations performed by an intelligent systems maintenance/monitor system to identify and service ambiguous Line Replaceable Component faults according to an embodiment of the present invention.

FIG. 5 is a flow diagram illustrating operations performed by an ISM/M system 100A to identify and service ambiguous LRC faults according to an embodiment of the present invention. During flight, aircraft monitored system 200 acquires pertinent data related to aircraft inferential diagnostics (e.g., embedded diagnostic logic data). The recorded data provides particular flight conditions and subsystem performance for each LRC fault, clear isolation of failed LRCs in non-ambiguous LRC faults, and ambiguous isolation of failed LRCs in ambiguous LRC faults. Aircraft monitored system 200 sends flight data containing both ambiguous and non-ambiguous LRC faults to ISM/M system 100A (step 301). Processing engine 115 receives flight data (step 303). Non-ambiguous LRC faults can be serviced by a direct command from ISM/M system 100A to human machine interface 32 to replace non-ambiguous failed LRCs. Ambiguous LRC faults are harder to service, because no clear identification of problematic LRCs is available. Processing engine 115 separates ambiguous LRC faults from non-ambiguous LRC faults by monitoring the outcome of a built-in-test (BIT) (step 305). The BIT test classifies all faults into ambiguous and non-ambiguous, and sends all ambiguous LRC faults to Smart I/F engine 110 (step 307). Smart I/F engine 110A tests for pertinent data in all ambiguous LRC faults (step 309). If no pertinent data is found in any of the ambiguous LRC faults, Smart I/F engine 110 discards all data (step 311). Otherwise, Smart I/F engine 110 extracts pertinent data for each ambiguous LRC fault (step 313) and sends pertinent data to processing engine 115 (step 315). Processing engine 115 selects pertinent data including inferential diagnostics that provide ambiguous isolation of a failed LRC in one ambiguous LRC fault (step 317). All of the steps mentioned above can be done in-flight. During ground maintenance processing engine 115 searches archived system database 105 for similar cases, occurrences of similar failure scenarios, and relevant test stimuli (step 319). The cases and occurrences of similar failure scenarios are used to identify and isolate failed LRCs present in the ambiguous LRC fault selected. A logic engine software (SW) shell may be customized to perform the task in step 319. Processing engine 115 then sends the similar cases, the occurrences of similar failure scenarios, and the test stimuli, to logic engine 120 (step 321). Logic engine 120 performs inferential processing and trend recognition of ambiguous LRC fault data, for a clear identification of the failed LRC (steps 323, 325). Logic engine 120 also stimulates a subsystem "performance simulator" for a clear identification of the failed LRC (step 327). A dynamic model of the subsystem functionally containing a failed LRC may be used to act as a performance simulator of the physical subsystem containing a failed LRC. Logic engine 120 also uses built-in knowledge from archived system database 105 to pinpoint the failed LRC (step 329). A logic engine SW shell may be customized to perform the task in step 329. Logic engine 120 sends its analysis results back to processing engine 115 (step 331), which then sends these results to GUI engine 125 (step 333). GUI engine 125 generates a graphical snapshot of aircraft monitored system 200 which pinpoints problems, reliably highlights the failed LRC, and provides textual description in plain language of the faults occurred due to the failed LRC (step 335). A graphical user SW engine integrated with a logic SW engine may be implemented to perform the task in step 335. The graphical snapshot generated by GUI engine 125 is sent to human machine interface 32 (step 337). A test is performed in processing engine 115 to determine if more ambiguous LRC faults need to be analyzed (step 341). If the answer to the test is yes, ISM/M system 100A goes through LRC isolation analysis again. If the answer is no, then all information related to failed LRCs has been retrieved and sent to human machine interface 32. All failed LRCs are replaced using information from graphical snapshots generated by GUI engine 125 (step 343). Next, confirmatory engine 130 performs a post-maintenance conformity check to determine if all failed LRCs have been isolated and replaced (step 345). The task in step 345 may be implemented using a dynamic model of the subsystem functionally containing the problem LRCs, in concert with the SW confirmatory engine 130 to act as a conformity aid of the subsystem with a failed LRC. Once the replacement of failed LRCs has been completed, confirmatory engine 130 sends a request to processing engine 115 to return monitored system to service (step 347). Confirmatory engine 130 also requests processing engine 115 to update archived system database 105 with all new failure scenarios and information identified in all ambiguous LRC faults (step 349). Processing engine 115 updates archived system database 105 and returns monitored aircraft system 10 to service (step 351). A knowledge engine SW shell may be used to perform the update of archived system database 105. Hence, ISM/M system 100A functions as a learning engine.

Figure 6:
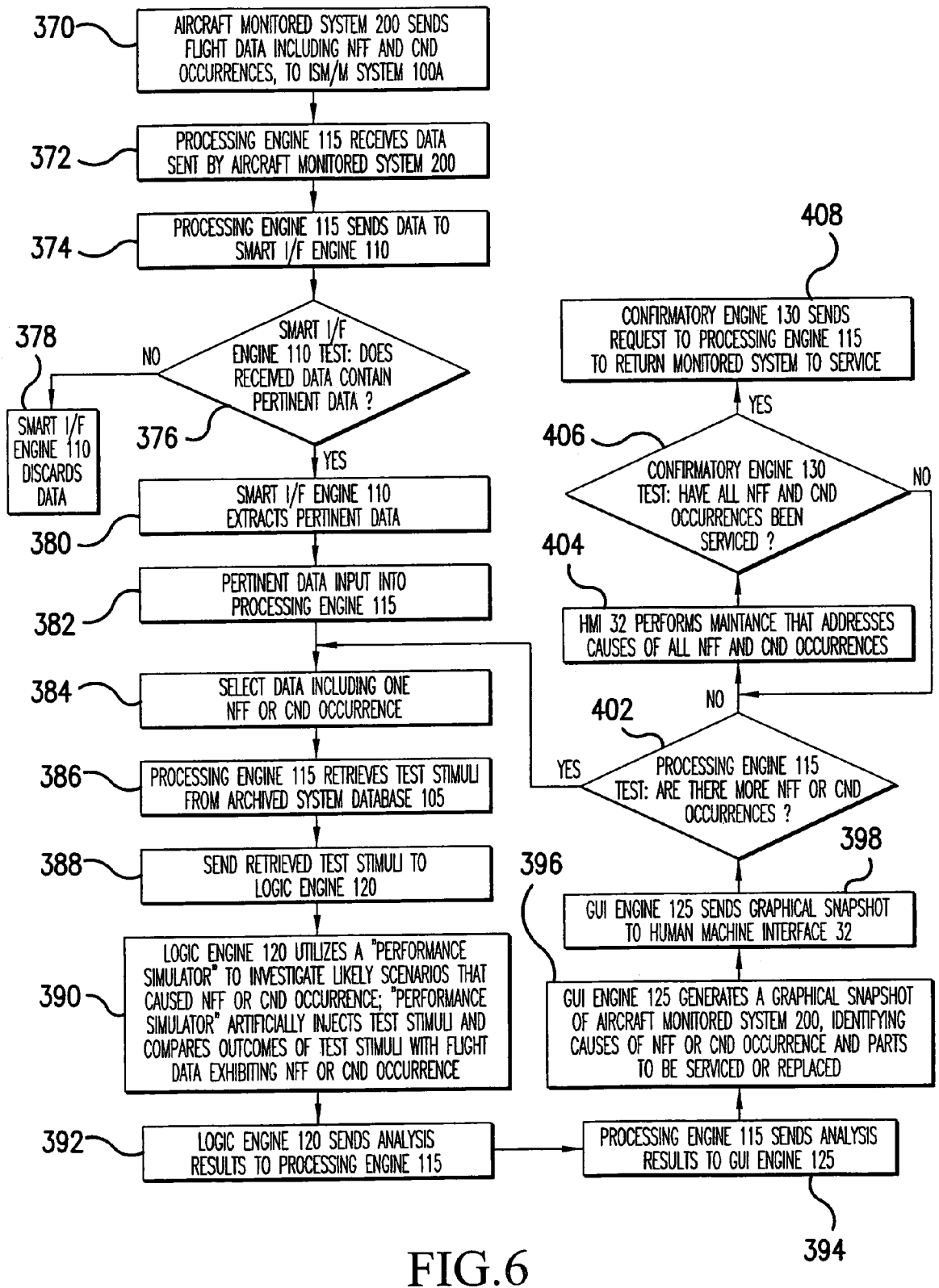
FIG. 6 is a flow diagram illustrating operations performed by an intelligent systems maintenance/monitor system to resolve No Fault Found and Can Not Duplicate incidences according to an embodiment of the present invention.

FIG. 6 is a flow diagram illustrating operations performed by an ISM/M system 100A to resolve No Fault Found (NFF) and Can Not Duplicate (CND) incidences according to an embodiment of the present invention. Aircraft monitored system 200 sends flight data with NFF and CND incidences to ISM/M system 100A (step 370). Processing engine 115 receives flight data with NFF and CND incidences (step 372). Processing engine 115 then sends flight data to Smart I/F engine 110 (step 374), which performs a test for presence of pertinent data in flight data (step 376). If no pertinent data is found in flight data, Smart I/F engine 110 discards flight data (step 378). Otherwise, Smart I/F engine 110 extracts pertinent data from flight data (step 380) and inputs extracted pertinent data into processing engine 115 (step 382). Processing engine 115 selects pertinent data including one NFF or CND occurrence (step 384). Processing engine 115 then retrieves test stimuli from archived system database 105 (step 386) and sends test stimuli to logic engine 120 (step 388). Logic engine 120 uses a "performance simulator" to investigate likely scenarios that might have caused the NFF or CND occurrence (step 390). The "performance simulator" artificially injects test stimuli into the subsystem exhibiting the NFF or CND fault, and compares test stimuli subsystem outcomes with actual flight data that exhibits the NFF or CND fault. Logic engine 120 then sends analysis results back to processing engine 115 (step 392), which then sends the analysis results to GUI engine 125 (step 394). GUI engine 125 generates a graphical snapshot of aircraft monitored system 200 that identifies causes of NFF or CND occurrence, and LRCs that need to be serviced or replaced (step 396). The graphical snapshot is sent to human machine interface 32 (step 398). Processing engine 115 performs a test to determine if there are more NFF and CND occurrences to be analyzed (step 402). If the answer to the test is yes, ISM/M system 100A selects another NFF or CND occurrence and goes again through analysis of NFF or CND occurrence. If the answer is no, then all information related to NFF and CND occurrences has been retrieved and sent to human machine interface 32. Maintenance work to address causes of all NFF and CND incidences is performed (step 404). Confirmatory engine 130 performs post NFF and CND confirmatory checks to determine if all NFF and CND occurrences have been analyzed, serviced and cleared (step 406). When maintenance for all NFF and CND incidences has been completed, confirmatory engine 130 sends a request to processing engine 115 to return monitored system to service (step 408).

Figure 7:
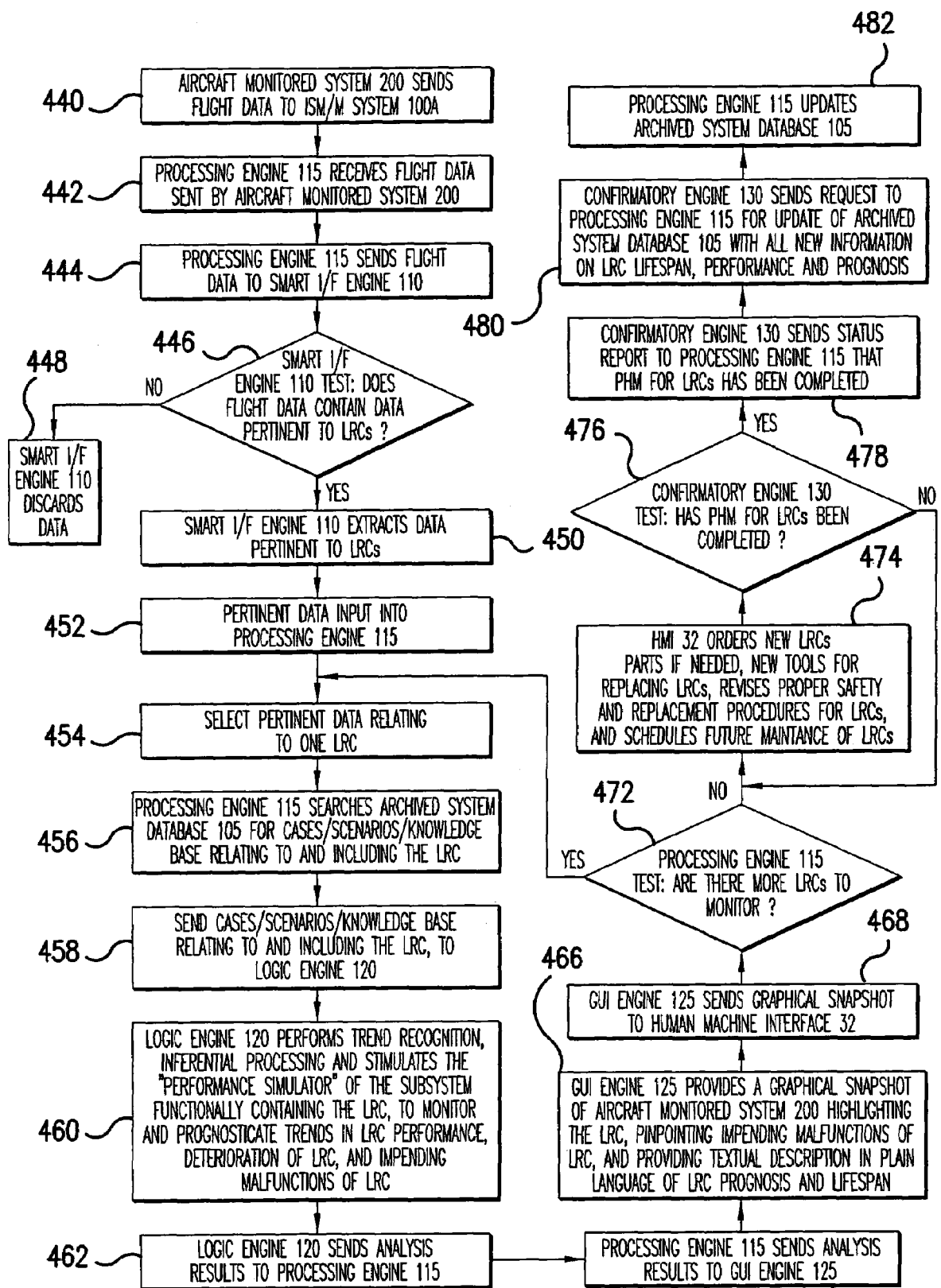
FIG. 7 is a flow diagram illustrating exemplary operations performed by an intelligent systems maintenance/monitor system to monitor and prognosticate trends in performance deterioration of Line Replaceable Components according to an embodiment of the present invention.

FIG. 7 is a flow diagram illustrating exemplary operations performed by an ISM/M system 100A to monitor and prognosticate trends in performance and performance deterioration of LRCs according to an embodiment of the present invention. System health trending supports opportunistic condition based maintenance strategy. Advanced prognostic and health management (PHM) technologies can be implemented to perform this task. One example of PHM technologies is detection of impending malfunctions of certain critical LRCs. Aircraft monitored system 200 sends flight data to ISM/M system 100A (step 440). Processing engine 115 receives flight data (step 442) and sends flight data to Smart I/F engine 110 (step 444), which performs a test for presence of LRCs pertinent data in flight data (step 446). If no pertinent LRCs data is found in flight data, Smart I/F engine 110 discards flight data (step 448). Otherwise, Smart I/F engine 110 extracts LRCs pertinent data from flight data (step 450), and sends it to processing engine 115 (step 452). Processing engine 115 then selects pertinent data relating to one LRC (step 454), and searches archived system database 105 for cases, scenarios, and knowledge base relating to that LRC (step 456). Processing engine 115 sends cases, scenarios, and knowledge base relating to the LRC to logic engine 120 (step 458). Logic engine 120 performs trend recognition, inferential processing, and stimulates a "performance simulator" of the subsystem functionally containing the LRC, in order to monitor and prognosticate trends in LRC performance, deterioration of the LRC, and impending malfunctions of the LRC (step 460). Logic engine 120 sends analysis results back to processing engine 115 (step 462), which then sends the results to GUI engine 125 (step 464). GUI engine 125 provides a graphical snapshot of aircraft monitored system 200 that highlights the LRC, pinpoints impending malfunctions of that LRC, and provides textual description in plain language of LRC prognosis and remaining lifespan (step 466). The graphical snapshot is sent to human machine interface 32 (step 468). A test is performed in processing engine 115 to determine if there are more LRCs to monitor (step 472). If the answer to the test is yes, ISM/M system 100A selects pertinent data for another LRC and goes through LRC PHM monitoring again. If the answer is no, then performance trends for all LRCs of interest have been analyzed. Based on information received from graphical snapshots generated by GUI engine 125, human machine interface 32 may order new LRC parts and new tools for replacing LRCs, may revise proper safety and replacement procedures for LRCs, and may schedule future timely maintenance of LRCs (step 474). Confirmatory engine 130 performs a test to determine if PHM for all LRCs has been completed (step 476). Once PHM for all LRCs has been completed, confirmatory engine 130 sends a completion status report to processing engine 115 (step 478). Confirmatory engine 130 also sends a request to processing engine 115 to update archived system database 105 with all new information on LRC lifespan, performance and prognosis (step 480). Processing engine 115 then updates archived system database 105 (step 482).

Figure 8:
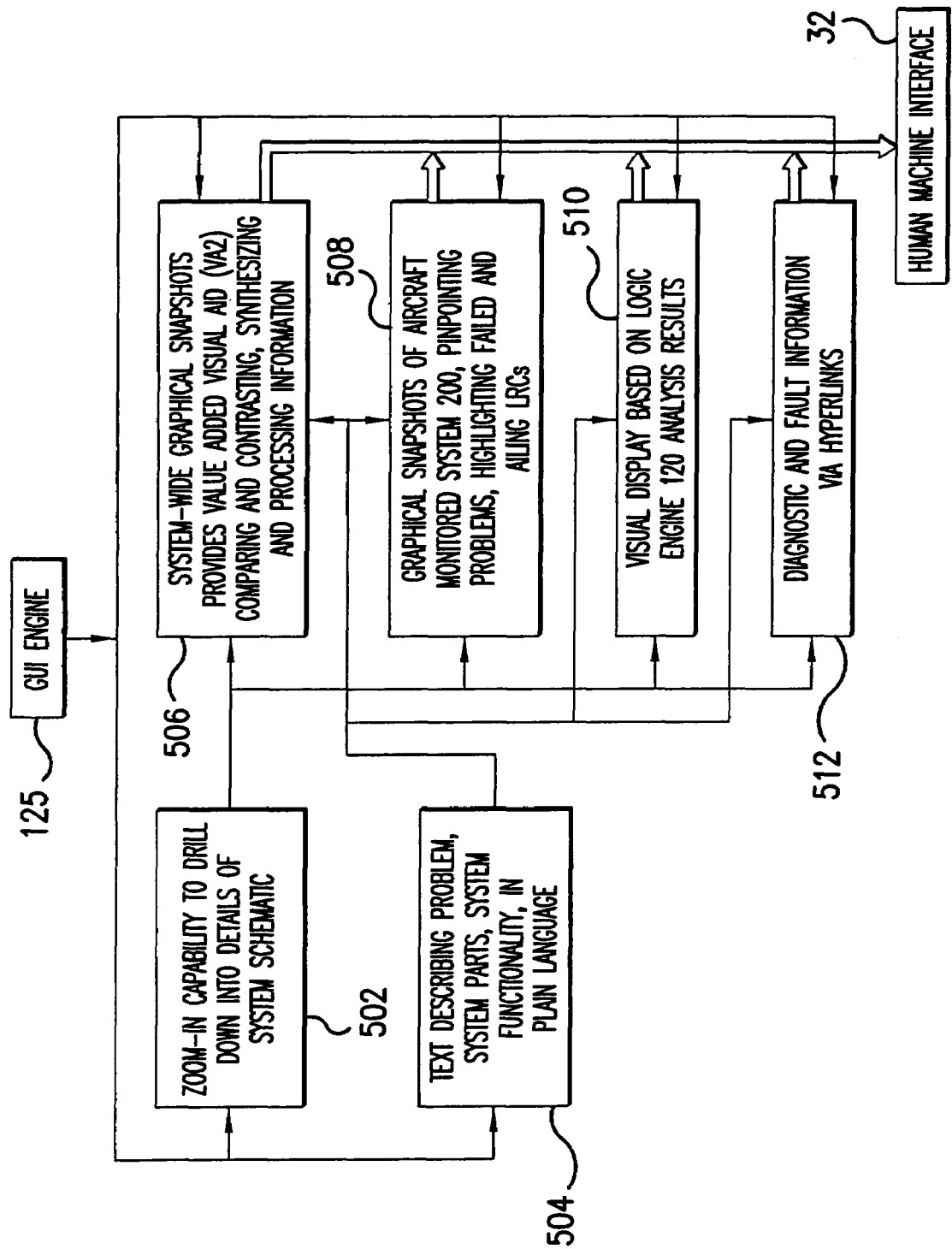
FIG. 8 is a flow diagram illustrating exemplary operations performed by a graphical user interface engine included in an intelligent systems maintenance/monitor system according to an embodiment of the present invention.

FIG. 8 is a flow diagram illustrating exemplary operations performed by a GUI engine 125 included in an ISM/M system 100A according to an embodiment of the present invention. GUI engine 125 generates multiple displays including: system-wide graphical snapshots that compare and contrast, synthesize and process information, thus providing value added visual aid (VA2) (506); graphical snapshots of aircraft monitored system 200 that pinpoint problems and highlight failed and ailing LRCs (508); visual displays of results from analyses performed by logic engine 120 (510); and hyperlinks with diagnostic and fault information that describe system problems in plain text to help the technician or engineer and eliminate the need to read and decipher cryptic fault codes (512). All displays generated by GUI engine 125 exhibit zoom-in capability to drill down into the details of the system schematics (502), and feature text describing problems, system parts, and system functionality in plain language (504). Information about state of system components can be color-coded, such as red for fault and green for OK. Graphical indication of system status and fault type can also be present in the graphical snapshots. Hard faults of a system that is either ON or OFF can be indicated with a different color or font than soft continuous-value faults. All visual displays generated by GUI engine 125 are used by human machine interface 32.

Figure 9:
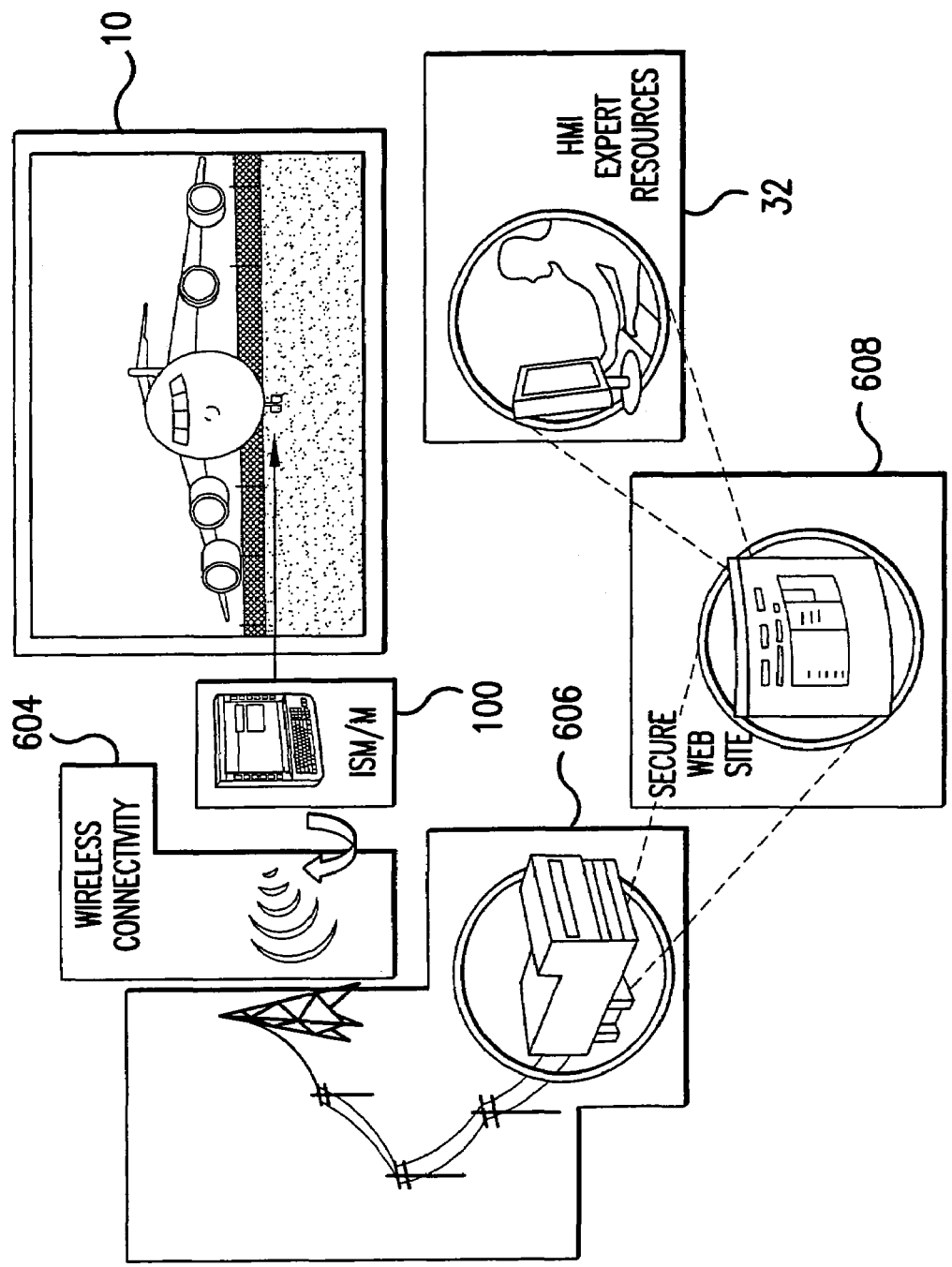
FIG. 9 illustrates an exemplary system arrangement including an intelligent systems maintenance/monitor system and using wireless technology to provide real time system status to remote technical personnel for monitoring and maintenance analysis in accordance with an embodiment of the present invention.

FIG. 9 illustrates an exemplary system arrangement including an ISM/M system 100 and using wireless technology to provide real time system status to remote technical personnel for monitoring and maintenance analysis in accordance with an embodiment of the present invention. Using wireless technology 604 via secure Internet connectivity 606 and 608, ISM/M system 100 provides real time status of aircraft system 10 to remote technical personnel and expert human machine interface 32, for complex problem debug and maintenance strategy.

Figure 10:
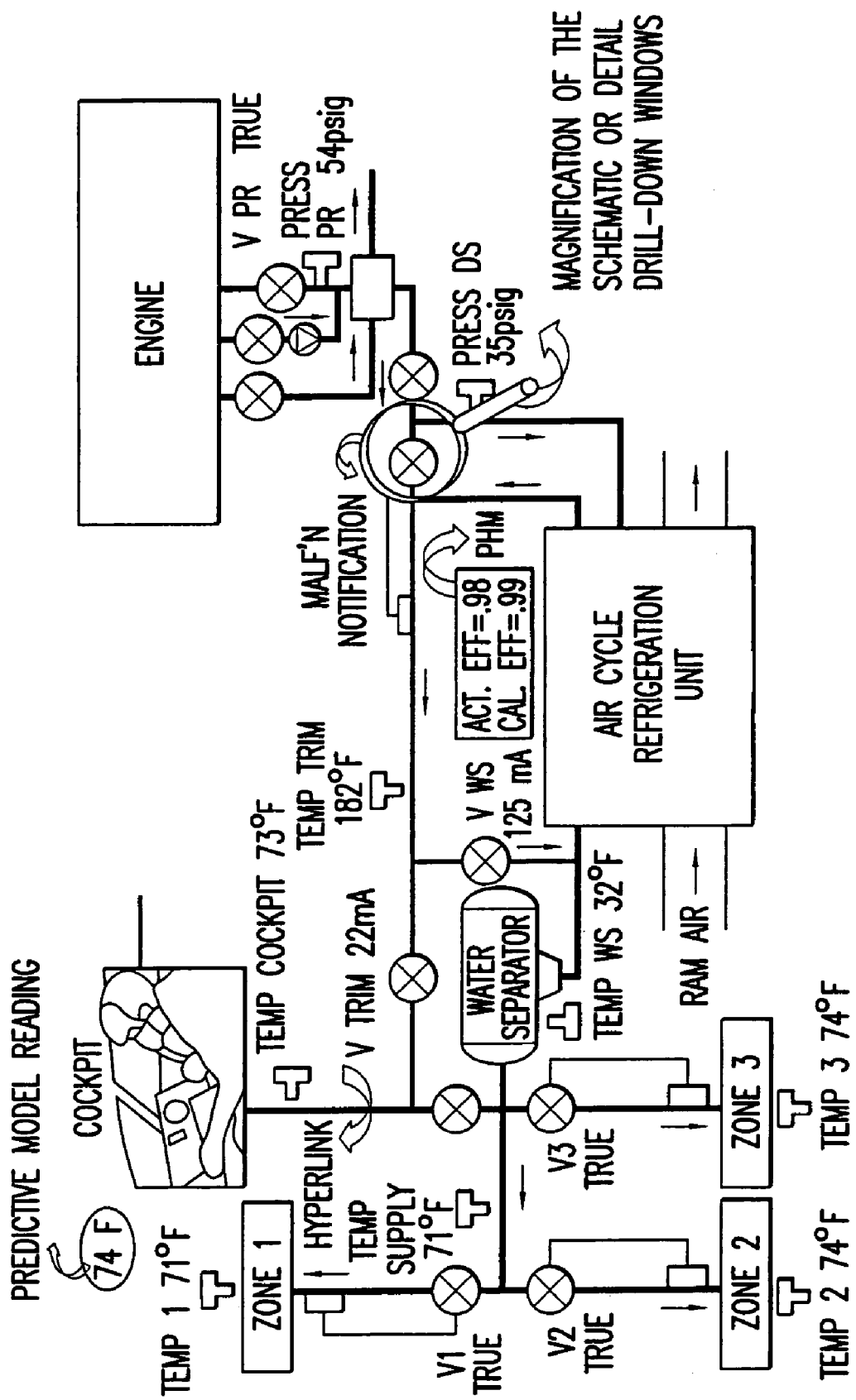
FIG. 10 illustrates an exemplary value-added visual aid graphical snapshot generated by an intelligent systems maintenance/monitor system according to an embodiment of the present invention.

FIG. 10 illustrates an exemplary value-added (VA2) visual aid graphical snapshot generated by an ISM/M system 100 according to an embodiment of the present invention. A VA2 graphical snapshot includes True/False components state information, up-to-date system parameter values, and predictive model readings for subsystems' performance.

Figure 11A:
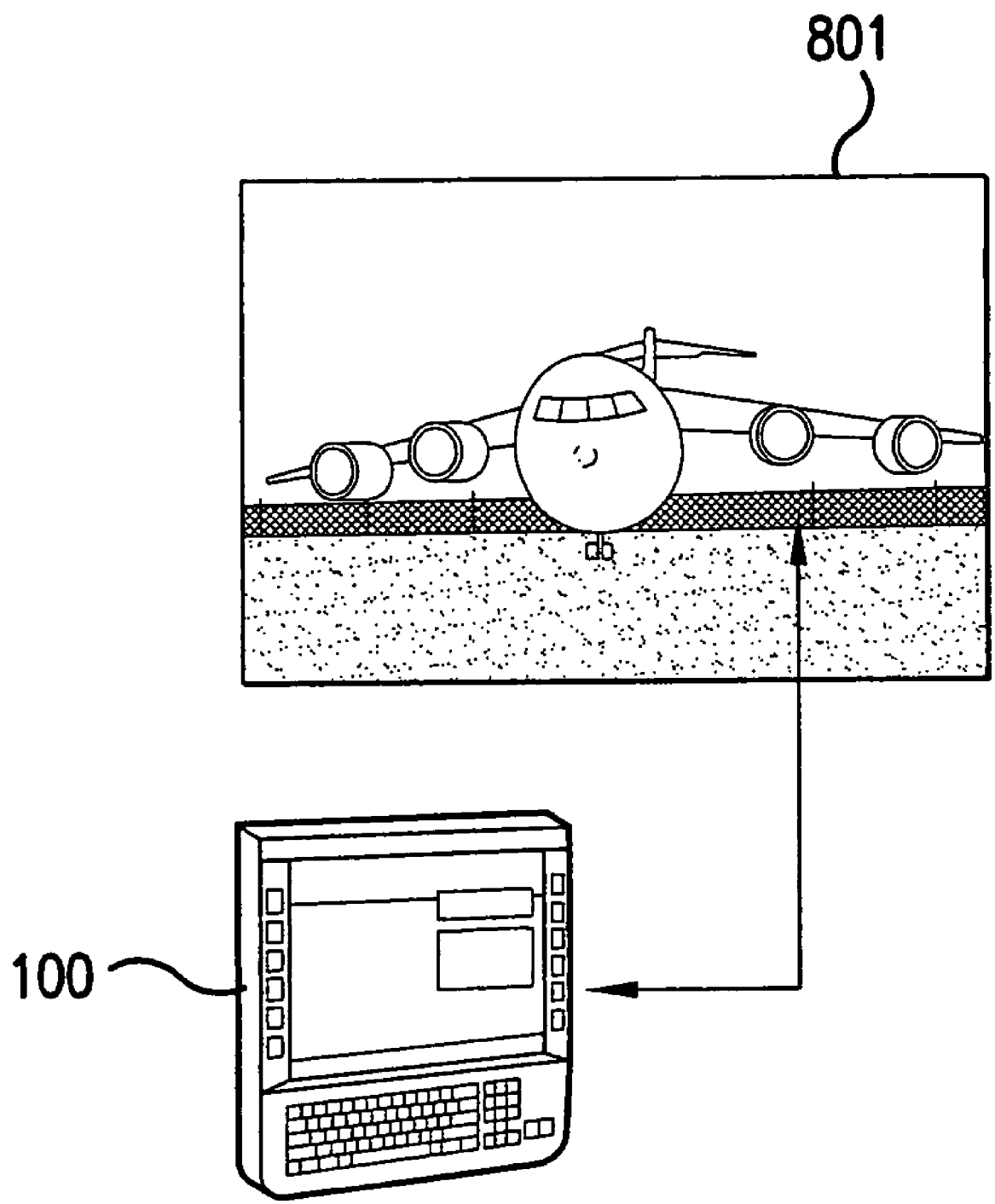
FIG. 11A illustrates an exemplary application environment to which principles of an intelligent systems maintenance/monitor system may be applied to achieve intelligent systems maintenance/monitoring according to an embodiment of the present invention.

FIG. 11A illustrates an exemplary application environment to which principles of an ISM/M system 100 may be applied to achieve intelligent systems maintenance/monitoring according to an embodiment of the present invention. ISM/M system 100 may provide monitoring and maintenance for ground service or in-production debug of an aircraft 801. ISM/M system 100 can perform the following operations as part of ground maintenance and in-production debug of aircraft 801: run and validate models including system qualification data information in ground mode, to identify deviations of system performance indicators from ideal performance indicators; run aircraft system 801 in known states against complex or rudimentary models, to pick up discrepancies, and highlight them through graphics; provide hyperlinks or pages with Failure Mode Effects Analysis (FMEA) and diagnostic information, via hardcopy or electronic data; download and store off-load flight information; perform BIT monitoring via the Environmental Control System (ECS system) controller, and display Aircraft Engine Services (AES) avionics information; provide intelligence by removing ambiguity using BIT, inferential BIT logic, and component PHM logic, and suggest potential solutions for returning aircraft system 801 to service, then poll aircraft system 801 to confirm correctness of post maintenance operation of the system; generate 2-D bit map images of Environmental Control System (ECS—for cabin cooling, heating, and cooling of avionics), Electric Power (EP) system, and AES system; isolate faults; capture data from flight recorder; run ECS, Aircraft Instrumentation and Equipment system, and avionics system against pre-determined models; monitor ECS, Auxiliary Power Unit (APU), AES, Electronic Power (EP), and avionics systems to observe any anomalies; run aircraft system 801 with prognostics health management (PHM) logic for PHM applications; save specific aircraft (A/C) data to refine the intelligence logic for intelligent monitoring; prevent unnecessary or incorrect LRU removals from A/C.

Figure 11B:
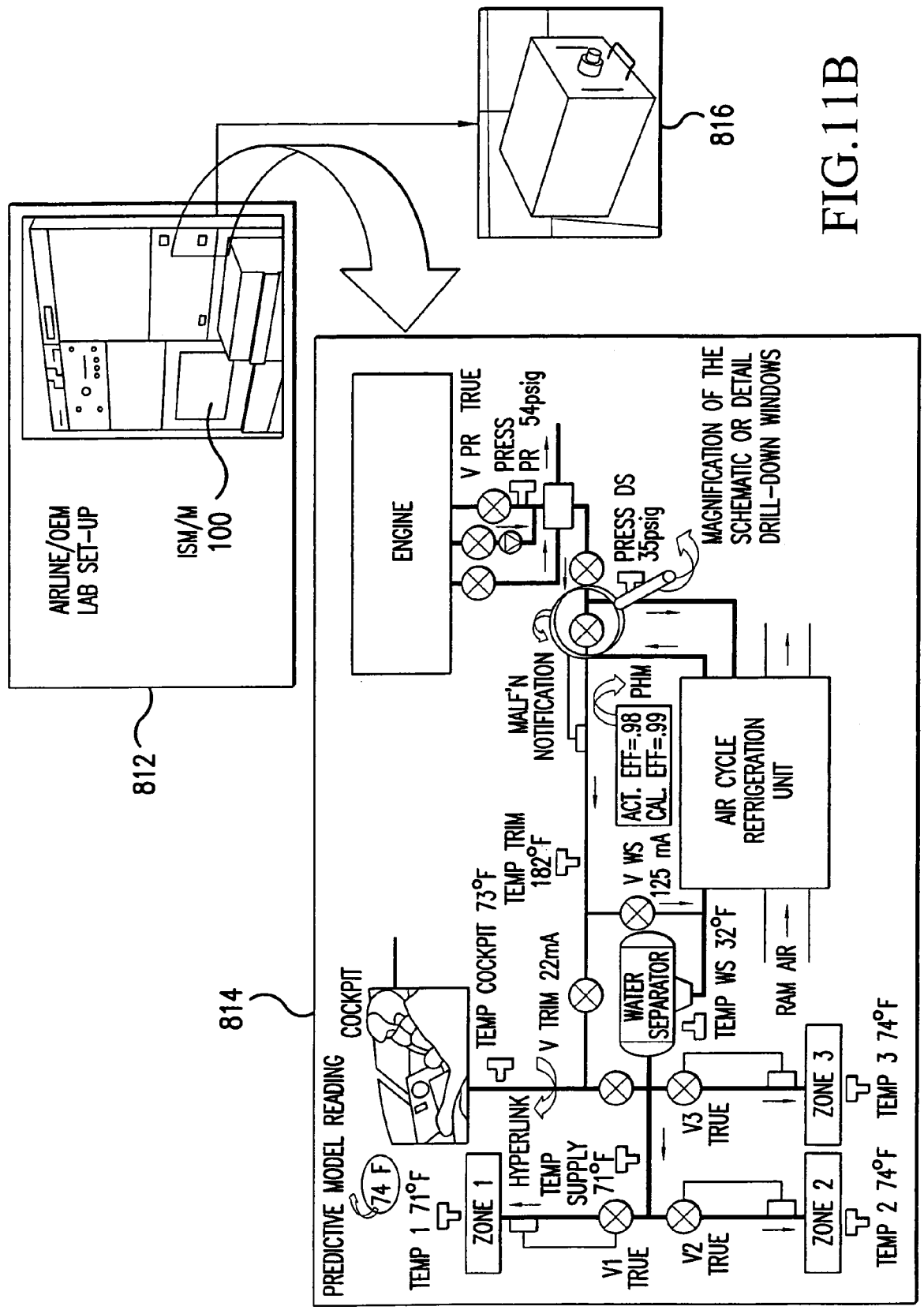
FIG. 11B illustrates an exemplary application environment to which principles of an intelligent systems maintenance/monitor system may be applied to achieve intelligent systems maintenance/monitoring according to an embodiment of the present invention.

FIG. 11B illustrates an exemplary application environment to which principles of an ISM/M system 100 may be applied to achieve intelligent systems maintenance/monitoring according to an embodiment of the present invention. ISM/M system 100 may provide monitoring and maintenance for flight line control and original equipment manufactured (OEM) vehicle lab facility set-up 812. ISM/M system 100 can perform the following operations as part of flight line control and OEM lab facility set-up 812: compare system performance against modeling info to identify deviations of system performance indicators from ideal performance indicators; run lab facility set-up 812 in known states against complex or rudimentary models, to pick up discrepancies, and highlight them through graphics; provide hyperlinks or pages with Failure Mode Effects Analysis (FMEA) and diagnostic information; provide system-wide schematics 814 with drill-down capability; download and store off-load flight information; perform BIT monitoring via ECS system controller and display Aircraft Engine Services (AES) avionics information; provide intelligence by removing ambiguity using BIT, inferential BIT logic, and component PHM logic; generate 2-D bit map images of Environmental Control System (ECS), Electric Power (EP) system, and AES system; isolate faults; capture data from flight recorder; run ECS system, Aircraft Auxiliary Power Unit (APU) system, and AES avionics system against pre-determined models; run Automated Test Procedures (ATP) for controller and support systems; debug flight anomalies; monitor ECS, APU, AES, Electronic Power (EP), and Avionics systems to observe any anomalies; run lab facility 812 with PHM logic for PHM applications; save specific lab facility 812 data to refine the intelligence logic for intelligent monitoring; capture flight data using controllers; run latent PHM models to isolate degrading trends; act as a Systems Engineer on the go by extracting, analyzing, displaying data, and providing intelligence on particular lab facility 812 sub-systems.

Figure 12:
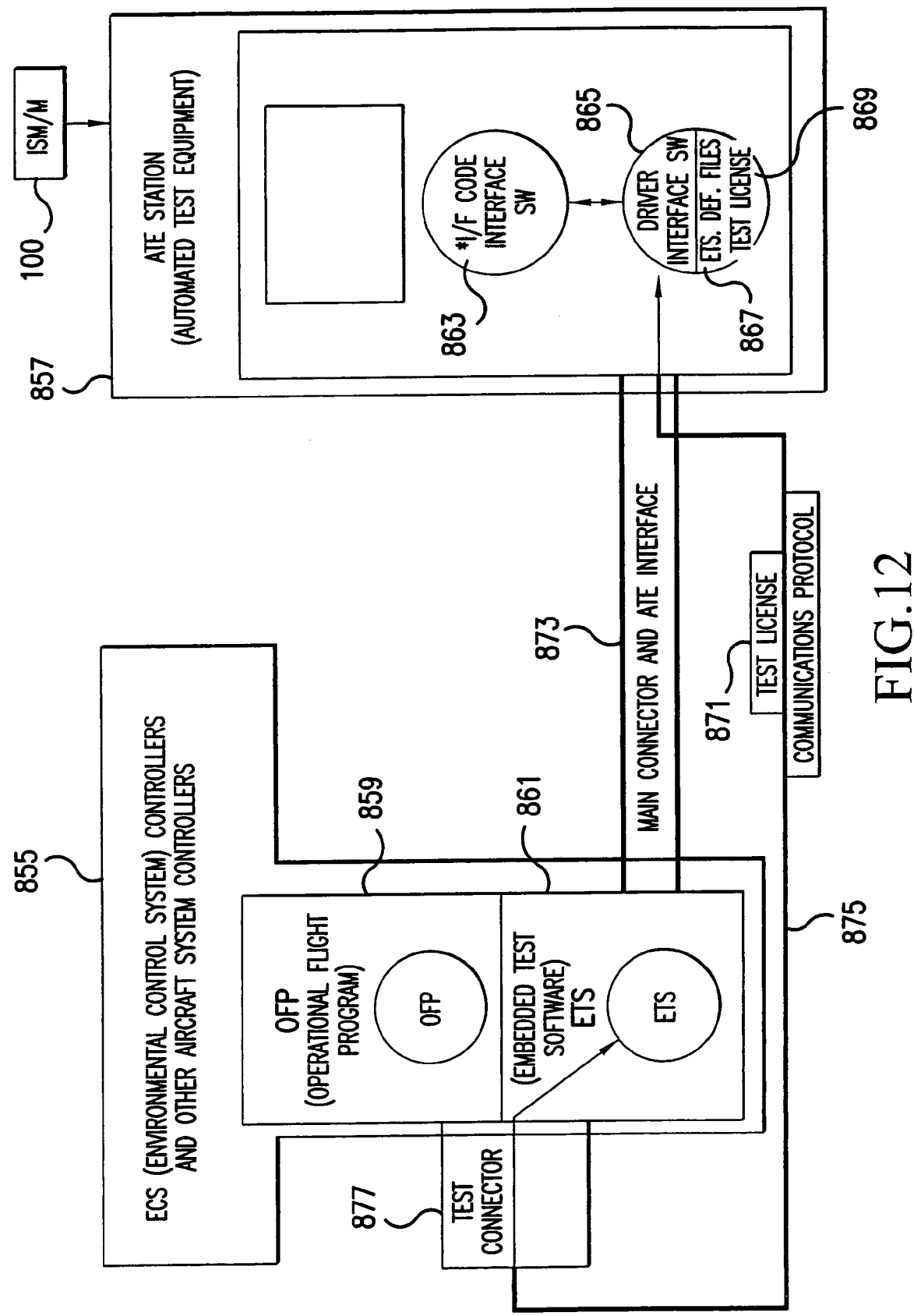
FIG. 12 illustrates an exemplary test setup of an intelligent systems maintenance/monitor system in an original equipment manufactured (OEM) vehicle or airline lab according to an embodiment of the present invention.

FIG. 12 illustrates an exemplary test setup of ISM/M system 100 in an OEM or airline lab according to an embodiment of the present invention. ISM/M 100 can be located within Automated Test Equipment (ATE) Station 857 of a vehicle or aircraft, or on a separate laptop that communicates with Automated Test Equipment (ATE) Station 857. ISM/M 100 monitors and controls I/F Code module 863 and Driver 865, both of which are interface software and reside within ATE Station 857. ATE Station 857 receives data from Electric Power system, Environmental Control System (ECS) controllers and other Aircraft System controllers 855 through main connector and ATE interface 873. Environmental Control System (ECS) and other Aircraft System controllers 855 include the Operational Flight Program (OFP) 859 and the Embedded Test Software (ETS) 861, which extract residence controller info. Test connector 877 sends ETS 861 data to ATE interface 873 through secure protocol 875. Test licenses 871 and 869 are necessary in order to perform testing within ATE interface 873.

Figure 13:
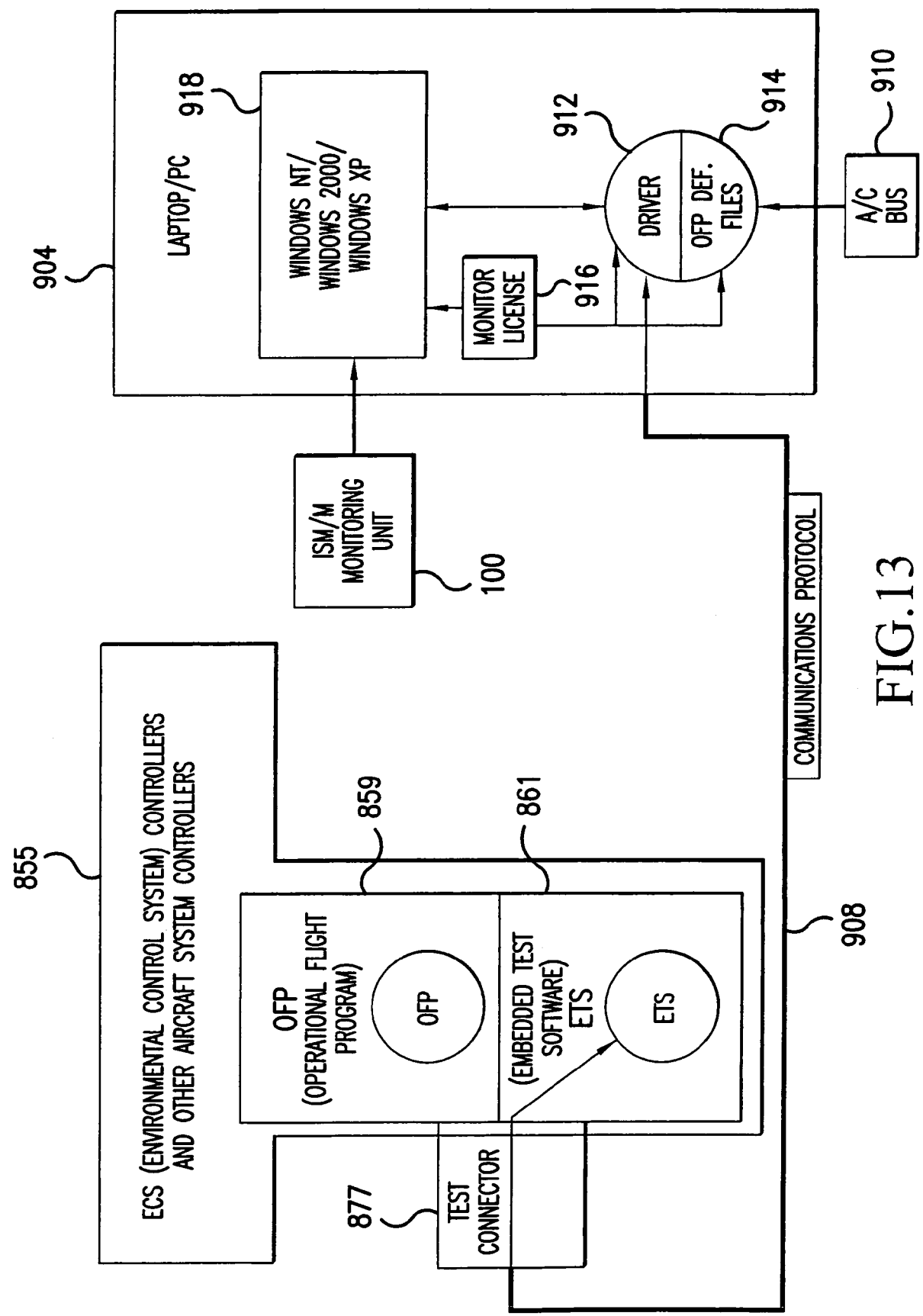
FIG. 13 illustrates an exemplary setup of an intelligent systems maintenance/monitor system in an aircraft according to an embodiment of the present invention.

FIG. 13 illustrates an exemplary setup of an ISM/M system 100 in an aircraft according to an embodiment of the present invention. ISM/M 100 can be located on a PC 904 on an aircraft, or on a separate laptop or computer that communicates with PC 904. ISM/M 100 may reside within operating system 918 of PC 904, which may be Windows NT, Windows 2000 or Windows XP. ISM/M 100 monitors and controls OFP definition files module 914 and Driver 912, both of which reside within PC 904. PC 904 communicates with Environmental Control System (ECS) and other Aircraft System controllers 855 through communication protocol 908. Test connector 877 sends ETS 861 data to PC 904. Environmental Control System (ECS) and other Aircraft System controllers 855 include Operational Flight Program (OFP) 859 and Embedded Test Software (ETS) 861. Monitor licenses 916 are necessary for ISM/M 100 to perform monitoring of Driver 913 and OFP definition files module 914. Aircraft (A/C) Bus 910 also communicates with Driver 913 and OFP definition files module 914.

Figure 14:
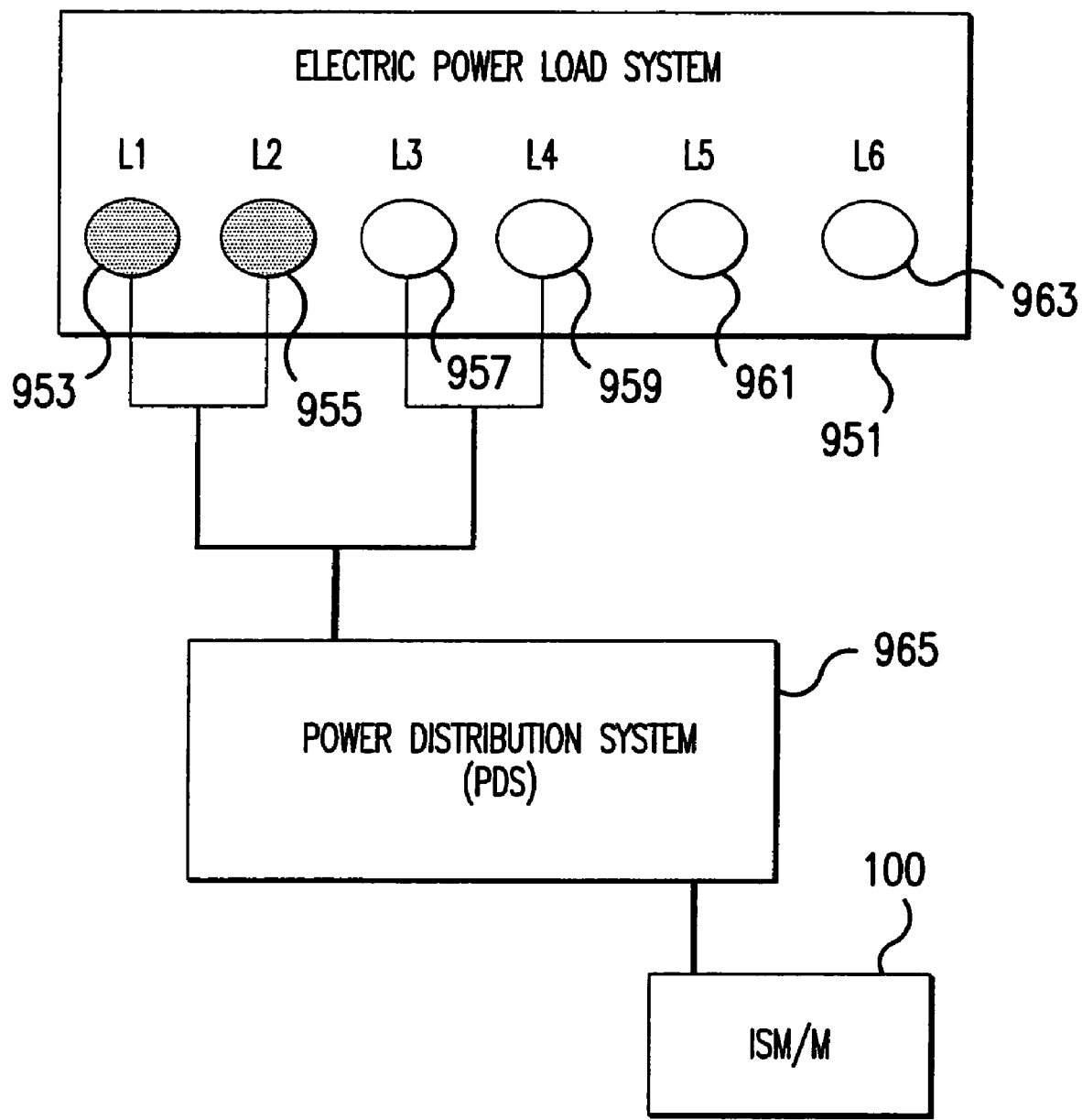
FIG. 14 illustrates an exemplary application environment to which principles of an intelligent systems maintenance/monitor system may be applied to achieve intelligent systems maintenance/monitoring according to an embodiment of the present invention.

FIG. 14 illustrates an exemplary application environment to which principles of an ISM/M system 100 may be applied to achieve intelligent systems maintenance/monitoring according to an embodiment of the present invention. An electric power load system 951 including electric loads L1 (953), L2 (955), L3 (957), L4 (959), L5 (961) and L6 (963) is connected to a Power Distribution System (PDS) 965 which is maintained and monitored by an ISM/M system 100. PDS 965 is a power management device for use when electric loads corresponding to various pieces of equipment of a vehicle are powered from the same source. ISM/M system 100 performs the following functions: control electric loads that are connected to PDS 965 at one time, such as loads L1 (953) and L2 (955) in FIG. 14; monitor performance of PDS 965 and status and maintenance needs for electric power loads in electric power load system 951; monitor and report bus and load disturbances; monitor auxiliary power unit (APU) start disturbances; monitor power system anomalies; display status of electrical power load system 951. ISM/M system 100 can be used to achieve aforementioned maintenance/monitoring functions on an aircraft, on an automotive vehicle, in a marine system such as a ship and submarine, and in industrial plants such as power plants.

Figure 15:
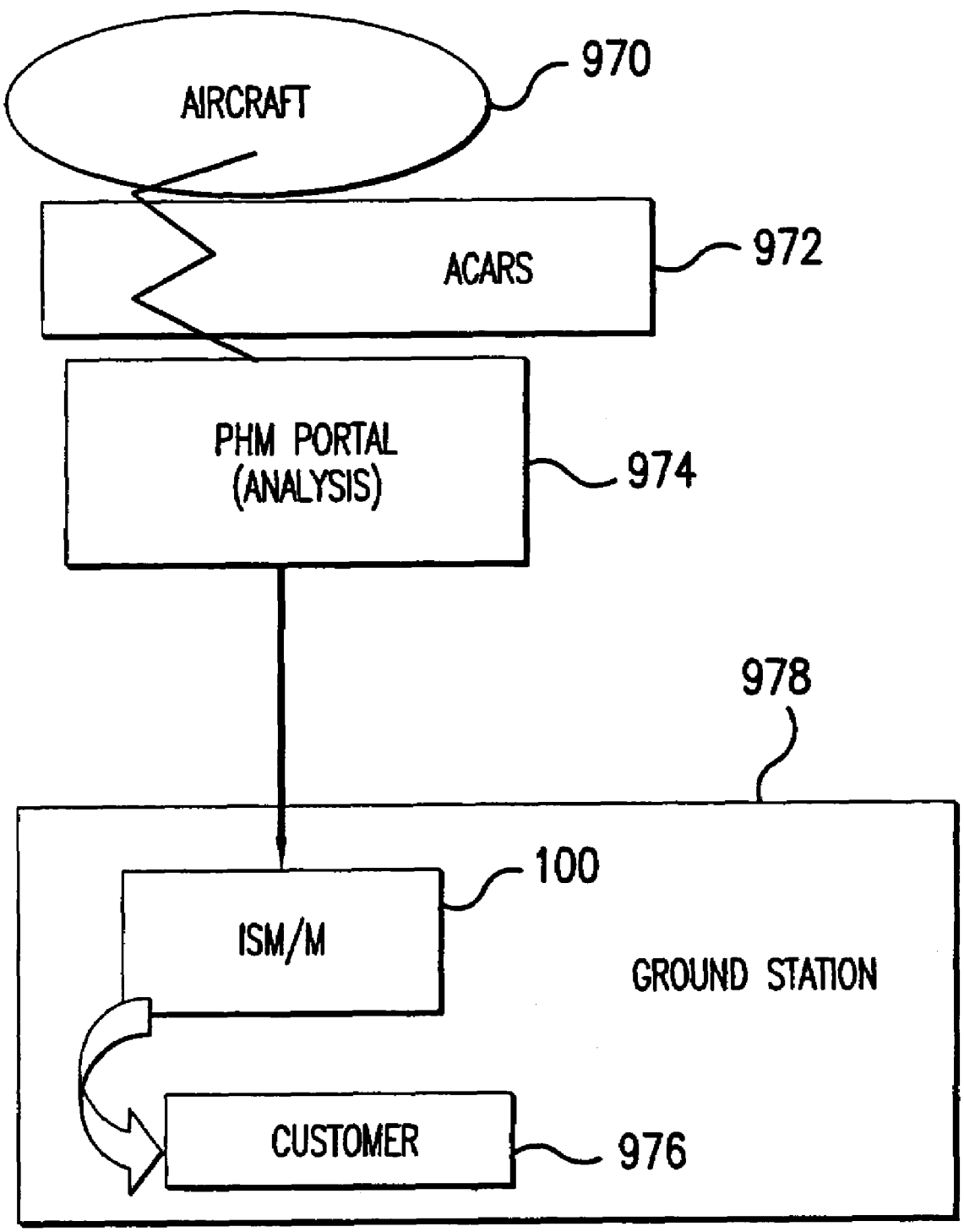
FIG. 15 illustrates an exemplary application environment to which principles of an intelligent systems maintenance/monitor system may be applied to achieve intelligent systems maintenance/monitoring according to an embodiment of the present invention.

FIG. 15 illustrates an exemplary application environment to which principles of an ISM/M system 100 may be applied to achieve intelligent systems maintenance/monitoring according to an embodiment of the present invention. An aircraft 970 exchanges reports and messages with Ground Station 978, through the Aircraft Communications Addressing and Reporting System (ACARS) 972. ACARS 972 is an addressable, digital data link for commercial and business jets and their respective companies, and is used to reduce the flight crew's workload by using modem computer technology to exchange reports and messages. ACARS improves the safety and efficiency of air travel. Aircraft 970 may send data to a PHM Portal Analysis 974. The PHM data can be analyzed by ISM/M system 100 that then forwards the results of the analysis to a customer 976 which may be a commercial or business jet company. ISM/M system 100 can be used to achieve aforementioned maintenance/monitoring functions on an aircraft, on an automotive vehicle, in a marine system such as a ship and submarine, and in industrial plants such as power plants.

An implementation of ISM/M system 100 for applications described in FIGS. 9, 11A, 11B, 12, 13, 14, and 15, as well as other applications compatible with ISM/M system 100, may integrate a plurality of software tools on a laptop to provide aircraft system debug and enhanced ground maintenance support. The software may interface with a monitored system, such as an Environmental Control System, to perform maintenance and monitoring tasks.

We claim:

1. A method of intelligent monitoring and maintenance of a system by means of a plurality of software tools operating on a separate computer processor having a memory and an output device for interaction with an operator, the system comprised of functional components having an online built-in-test functions, said method comprising:

providing an archived system database residing in the memory of the separate computer processor, the archived system database containing prior data associated with expected and previous results of built-in-tests;

accessing test data relating to functional components of said system;

extracting parameter information for said functional components of said system, said step of extracting parameter information including monitoring the results of the built-in-tests;

determining the presence of non-ambiguous faults and ambiguous faults based upon test data associated with the results of the built-in-tests;

providing an indication on the output device to the operator to replace said functional components associated with non-ambiguous faults as determined by the results of the built-in-tests;

while an ambiguous fault has not been examined, then performing the following steps:

selecting an ambiguous fault for examination;

extracting ambiguous data from test data associated with the results of built-in-tests from which an ambiguous fault is determined;

reducing ambiguity in said ambiguous data;

performing inferential processing and trend recognition of said ambiguous data using prior data, and simulating performance of said system using models of said system and previous said prior data about said system; and identifying new data present in said extracted parameter information;

updating the archived system database with the new data wherein the new data becomes prior data.

2. The method of intelligent monitoring and maintenance of a system as recited in claim 1, wherein the step of extracting parameter information further comprises:

generating images on the output device including said functional components of said system and said extracted parameter information for said functional components of said system, said images having hyperlinks, drill-down capabilities, and textual descriptions.

3. The method of intelligent monitoring and maintenance of a system as recited in claim 1, further comprising:

executing confirmatory checks and status reports for said system based on said extracted parameter information for said functional components of said system.

4. The method of intelligent monitoring and maintenance of a system as recited in claim 1, wherein said step of extracting parameter information for said functional components of said system further includes making predictions about failures of said functional components of said system, and scheduling opportunistic maintenance sessions based on said predictions.

5. The method of intelligent monitoring and maintenance of a system as recited in claim 1, wherein said step of extracting parameter information for said functional components of said system further includes validating said models of said system, and creating failure scenarios using said models of said system by collecting outcomes of said models under simulated conditions.

6. The method of intelligent monitoring and maintenance of the system as recited in claim 1, further comprising:

detecting No Fault Found and Can Not Duplicate instances in said ambiguous data;

simulating performance of said system by changing states of said functional components of said system in said models of said system, and collecting outcomes of said models of said system;

matching said No Fault Found and Can Not Duplicate instances with said outcomes of said models of said system that exhibit similar functional behavior; and identifying the functional components that caused said No Fault Found and Can Not Duplicate instances as the functional components that caused said outcomes with said similar functional behavior.

7. The method of intelligent monitoring and maintenance of a system as recited in claim 1, wherein said step of extracting parameter information for said functional components of said system further includes performing advanced prognostic and health management for said functional components of said system.

8. The method of intelligent monitoring and maintenance of a system as recited in claim 1, further comprising:

using a wireless link to send said parameter information for said functional components of said system.

9. An apparatus for intelligent monitoring and maintenance of a system, said apparatus comprising:

a computer processor separate from the system being monitored, the computer processor having memory and an output device;

an archived system database containing prior data about said system, the archived system database residing in the memory of the computer processor;

a plurality of software components stored in the memory of the computer processor, the components comprising the following:

a smart interface engine for accessing data relating to functional components of said system;

a logic engine for extracting parameter information for said functional components of said system, said logic engine extracting parameter information for said functional components by monitoring an outcome of built-in-tests associated with said functional components;

determining the presence of non-ambiguous faults and ambiguous faults;

providing an indication on the output device to replace said functional components associated with non-ambiguous faults;

while ambiguous faults are present, performing the following steps:

selecting an unresolved ambiguous fault for processing;

extracting ambiguous data relating to said system from said data containing the selected ambiguous fault;

reducing ambiguity in the ambiguous data;

performing inferential processing and trend recognition of said data using the prior data about said system that is retrieved from said archived system database, and utilizing a performance simulator to simulate performance of said system using models of said system and the prior data about said system from said archived system database; and presenting on the output device the results of the inferential processing, the trend recognition, and the simulation; and a confirmatory engine for updating said archived system database with new data present in said extracted parameter information.

10. The apparatus according to claim 9, further comprising:

a graphical user interface engine for generating images including said functional components of said system and said extracted parameter information for said functional components of said system, said images having hyperlinks, drill-down capabilities, and textual descriptions.

11. The apparatus according to claim 10, wherein said graphical user interface engine generates visual aids that pinpoint failed functional components and provide training and maintenance help for maintenance personnel.

12. The apparatus according to claim 9, wherein said confirmatory engine executes confirmatory checks and creates status reports of said system based on said extracted parameter information for said functional components of said system.

13. The apparatus according to claim 9, wherein said logic engine makes predictions about failures of said functional components of said system, and said confirmatory engine requests opportunistic maintenance sessions based on said predictions from logic engine.

14. The apparatus according to claim 9, wherein said logic engine validates said models of said system and creates failure scenarios using said models of said system by collecting outcomes of said models under simulated conditions input by said performance simulator.

15. The apparatus according to claim 9, further comprising:

a detection unit for detecting No Fault Found and Can Not Duplicate instances in said ambiguous data; and a performance simulator of said system that changes states of said functional components of said system in said models of said system, collects outcomes of said models of said system, matches said No Fault Found and Can Not Duplicate instances with said outcomes of said models of said system that exhibit similar functional behavior, and identifies the functional components that caused said No Fault Found and Can Not Duplicate instances as the functional components that caused said outcomes with said similar functional behavior.

16. The apparatus according to claim 9, wherein said logic engine performs advanced prognostic and health management of said functional components of said system.

17. The apparatus according to claim 9, further comprising:

a wireless link that sends said parameter information for said functional components of said system.

* * * * *